(12) United States Patent
Yoo et al.

(10) Patent No.: US 7,722,693 B2
(45) Date of Patent: May 25, 2010

(54) CYCLONE DUST COLLECTING APPARATUS FOR VACUUM CLEANER

(75) Inventors: Dong-hun Yoo, Gwangju (KR); Jang-keun Oh, Gwangju (KR); Jung-gyun Han, Gwangju (KR)

(73) Assignee: Samsung Gwangju Electronics Co., Ltd, Gwangju (KR)

( * ) Notice: Subject to any disclaimer, the term of this patent is extended or adjusted under 35 U.S.C. 154(b) by 0 days.

(21) Appl. No.: 12/316,688

(22) Filed: Dec. 16, 2008

(65) Prior Publication Data

US 2009/0133370 A1 May 28, 2009

Related U.S. Application Data

(63) Continuation-in-part of application No. 11/494,211, filed on Jul. 27, 2006.

(60) Provisional application No. 60/776,408, filed on Feb. 24, 2006.

(30) Foreign Application Priority Data

Mar. 6, 2006 (KR) ................. 2006-20961
Apr. 6, 2006 (KR) ................. 2006-31518

(51) Int. Cl.
*B01D 45/12* (2006.01)

(52) U.S. Cl. .................. 55/345; 55/343; 55/346; 55/426; 55/429; 55/348; 55/459.3; 55/459.4; 55/455; 55/447; 55/DIG. 3; 15/353; 15/352

(58) Field of Classification Search .......... 55/337, 55/345, 346, 343, 426, 429, 459.3, 459.4, 55/348, 455, 447, DIG. 3; 15/353, 352
See application file for complete search history.

(56) References Cited

U.S. PATENT DOCUMENTS

| | | | | |
|---|---|---|---|---|
| 2,112,321 A * | 3/1938 | Wood | .......................... | 122/491 |
| 2,768,707 A | 10/1956 | Campbell | .................... | 55/455 |
| 3,034,647 A * | 5/1962 | Giesse | ......................... | 209/710 |
| 3,276,627 A * | 10/1966 | Birkestrand | ..................... | 222/1 |
| 3,305,940 A * | 2/1967 | Isler | ............................. | 34/593 |
| 3,969,096 A * | 7/1976 | Richard | ....................... | 55/455 |
| 4,643,748 A | 2/1987 | Dyson | ......................... | 55/338 |
| 4,826,515 A | 5/1989 | Dyson | ......................... | 55/345 |
| 6,428,589 B1 | 8/2002 | Bair et al. | ...................... | 55/318 |
| 7,547,340 B2 * | 6/2009 | Park | ............................ | 55/429 |
| 7,559,965 B2 * | 7/2009 | Oh et al. | ....................... | 55/424 |
| 7,563,296 B2 * | 7/2009 | Ni | ................................ | 55/337 |

(Continued)

FOREIGN PATENT DOCUMENTS

CN 1611177 5/2005

(Continued)

*Primary Examiner*—Jason M Greene
*Assistant Examiner*—Dung Bui
(74) *Attorney, Agent, or Firm*—Ohlandt, Greeley, Ruggiero & Perle, L.L.P

(57) ABSTRACT

A cyclone dust collecting apparatus for a vacuum cleaner includes a first cyclone, a second cyclone disposed inside the first cyclone, and an air guiding member to form an entrance of the second cyclone through which semi-clean air discharged from the first cyclone enters. The air guiding member includes a grill member to have a plurality of holes, and a plurality of guiding blades disposed inside the grill member.

13 Claims, 20 Drawing Sheets

U.S. PATENT DOCUMENTS

| | | | |
|---|---|---|---|
| 2002/0020154 A1* | 2/2002 | Yang | 55/337 |
| 2003/0159239 A1* | 8/2003 | Oh | 15/353 |
| 2003/0200622 A1* | 10/2003 | Park et al. | 15/353 |
| 2004/0154126 A1* | 8/2004 | Hansen et al. | 15/353 |
| 2004/0211025 A1* | 10/2004 | Jung et al. | 15/353 |
| 2005/0005392 A1* | 1/2005 | Jeong | 15/353 |
| 2007/0175185 A1* | 8/2007 | Kim et al. | 55/337 |
| 2008/0028940 A1* | 2/2008 | Han et al. | 96/417 |
| 2008/0302071 A1* | 12/2008 | Strutt et al. | 55/346 |
| 2009/0113859 A1* | 5/2009 | Oh et al. | 55/337 |
| 2009/0193771 A1* | 8/2009 | Oh et al. | 55/337 |
| 2009/0229071 A1* | 9/2009 | Fester et al. | 15/347 |
| 2009/0300874 A1* | 12/2009 | Tran et al. | 15/353 |

FOREIGN PATENT DOCUMENTS

| | | |
|---|---|---|
| EP | 0923992 | 6/1999 |
| KR | 1020040095374 | 11/2004 |
| WO | WO98/35601 | 8/1998 |
| WO | WO02/069778 | 9/2002 |

* cited by examiner

CYCLONE DUST COLLECTING APPARATUS FOR VACUUM CLEANER

CROSS-REFERENCE TO RELATED APPLICATIONS

This application is a continuation-in-part of U.S. patent application Ser. No. 11/494,211, filed Jul. 27, 2006, which claims priority to U.S. provisional patent application No. 60/776,408 filed Feb. 24, 2006 in the United States Patent & Trademark Office, and claims the benefit under 35 U.S.C. §119(a) from Korean Patent Application No. 2006-20961, filed Mar. 6, 2006 and No. 2006-31518 filed Apr. 6, 2006 in the Korean Intellectual Property Office, the disclosures of all of which are incorporated herein by reference in their entirety.

BACKGROUND OF THE INVENTION

1. Field of the Invention

The present disclosure relates to a vacuum cleaner. More particularly, the present disclosure relates to a cyclone dust collecting apparatus separating and collecting dust and dirt using centrifugal force.

2. Description of the Related Art

Generally, a vacuum cleaner generates suction force using a motor so as to draw-in air containing dust, dirt and so on (hereinafter, referred to as dust-laden air) from a surface to be cleaned by the suction force. Dust, dirt and so on (hereinafter, referred to as dust) contained in the dust-laden air is separated from the dust-laden air when the dust-laden air passes through a dust collecting apparatus disposed in a cleaner body of the vacuum cleaner, and cleaned air is discharged outside the cleaner body.

Recently, cyclone dust collecting apparatuses have been widely used as a dust collecting apparatus that separates dust from dust-laden air and collects the separated dust. The cyclone dust collecting apparatuses separate dust from dust-laden air using centrifugal force.

The conventional cyclone dust collecting apparatus includes an air suction pipe drawing-in dust-laden air, a cyclone body forcing the drawn-in dust-laden air to whirl, and an air discharging pipe discharging air having dust separated.

Therefore, the dust-laden air drawn in through the air suction pipe by suction force forms a whirling air current inside the cyclone body. Then, dust is separated and collected by the centrifugal force caused by the whirling air current, and cleaned air is discharged through the air discharging pipe.

The conventional cyclone dust collecting apparatus can easily separate relatively heavy dust from the drawn-in dust-laden air because there is a great difference between the centrifugal forces operating upon each of the relatively heavy dust and the air. However, the conventional cyclone dust collecting apparatus cannot separate fine dust well from the dust-laden air because there is little difference between weights of the fine dust and the air.

To increase the fine dust collecting efficiency, U.S. Pat. Nos. 4,643,748, 4,826,515, and 4,853,008 disclose a multi-cyclone dust collecting apparatus that has two cyclones and forces dust-laden air to whirl in two steps.

Because the conventional multi-cyclone dust collecting apparatus forces the dust-laden air to whirl in two steps, it has a higher fine dust collecting efficiency than the cyclone dust collecting apparatus having one cyclone. However, the conventional multi-cyclone dust collecting apparatus has a problem that a great pressure loss occurs when the dust-laden air is drawn-in from an inner cyclone to an outer cyclone.

SUMMARY OF THE INVENTION

The present disclosure has been developed in order to overcome the above drawbacks and other problems associated with the conventional arrangement. An aspect of the present disclosure is to provide a cyclone dust collecting apparatus for a vacuum cleaner having a smaller pressure loss and a higher fine dust collecting efficiency than the conventional cyclone dust collecting apparatus.

The above aspect and/or other feature of the present disclosure can substantially be achieved by providing a cyclone dust collecting apparatus for a vacuum cleaner, which may include a first cyclone; a second cyclone disposed inside the first cyclone; and an air guiding member to form an entrance of the second cyclone through which semi-clean air discharged from the first cyclone enters; wherein the air guiding member may include; a grill member to have a plurality of holes; and a plurality of guiding blades disposed inside the grill member.

The grill member and the plurality of guiding blades may be arranged in two concentric circles based on a vertical axis of the second cyclone.

The grill member may be formed substantially in a mesh shape.

The grill member may include a blocking portion at which the plurality of holes is not formed.

The blocking portion may be formed near an air suction hole of the first cyclone.

The plurality of guiding blades may form a plurality of slots through which the semi-clean air passed through the grill member enters. The plurality of slots may be inclined so that a height of an entrance of each of the plurality of slots is higher than a height of an exit of each of the plurality of slots.

The grill member may include a plurality of entering slant portions that is formed at a top end of the grill member corresponding to top portions of the plurality of slots and projects to be downwardly inclined from an inner surface of the top end of the grill member.

The air guiding member may be detachably disposed at the first cyclone.

The grill member and the plurality of guiding blades of the air guiding member may be separated from each other.

The plurality of guiding blades may include a plurality of locking hooks; and the first cyclone includes a plurality of locking holes formed to fix the plurality of locking hooks.

The cyclone dust collecting apparatus may include an air-discharging pipe disposed at a center of a top wall of the first cyclone. The air-discharging pipe may extend to the same level as a bottom end of the air guiding member, or to a lower level than the bottom end of the air guiding member; wherein the air-discharging pipe discharges cleaned air, which whirls downwardly and rises up inside the second cyclone, in a direction opposite to the gravity direction.

The cyclone dust collecting apparatus may include a dust collecting receptacle detachably disposed under the first and second cyclones so as to collect dust discharged from each of the first and second cyclones.

The dust collecting receptacle may include a first dust collecting chamber to collect dust separated from the first cyclone; and a second dust collecting chamber to collect fine dust separated from the second cyclone.

Other objects, advantages and salient features of the disclosure will become apparent from the following detailed description, which, taken in conjunction with the annexed drawings, discloses preferred embodiments of the disclosure.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined in the description, such as a detailed construction and elements thereof are provided to assist in a comprehensive understanding of the disclosure. Thus, it is apparent that the present disclosure may be carried out without those defined matters. Also, well-known functions or constructions are omitted to provide a clear and concise description of exemplary embodiments of the present disclosure.

Figure 1:
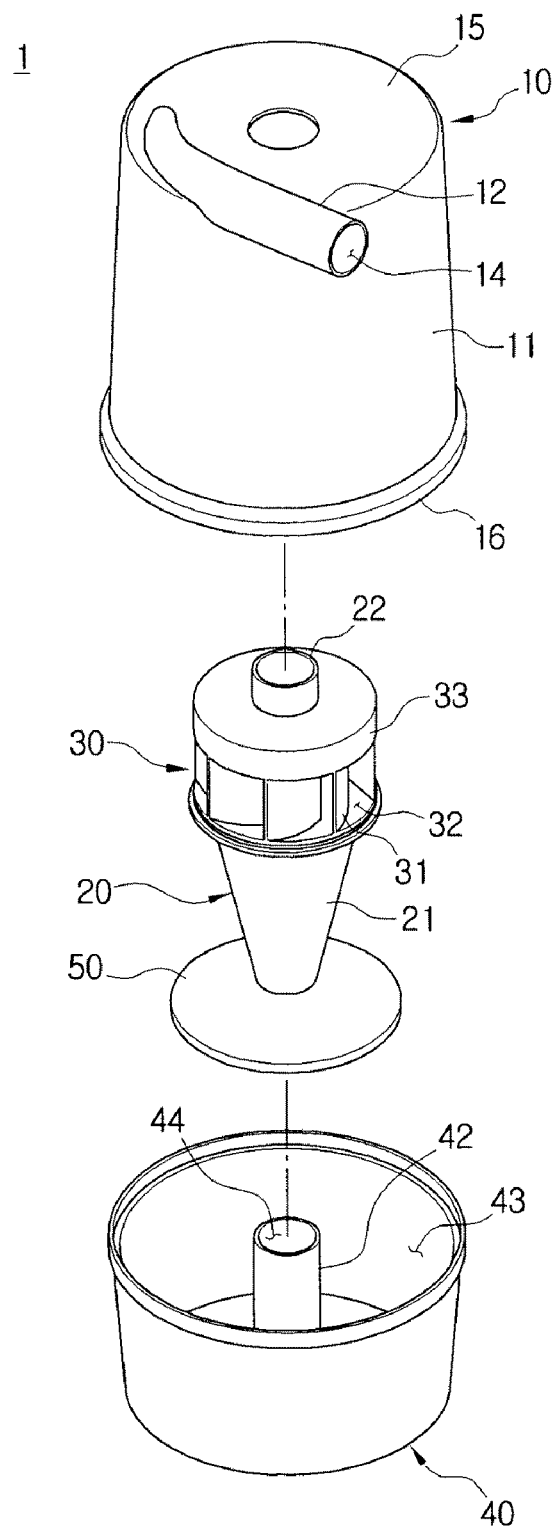
FIG. 1 is an exploded perspective view illustrating a cyclone dust collecting apparatus for a vacuum cleaner according to the first embodiment of the present disclosure.
Figure 2:
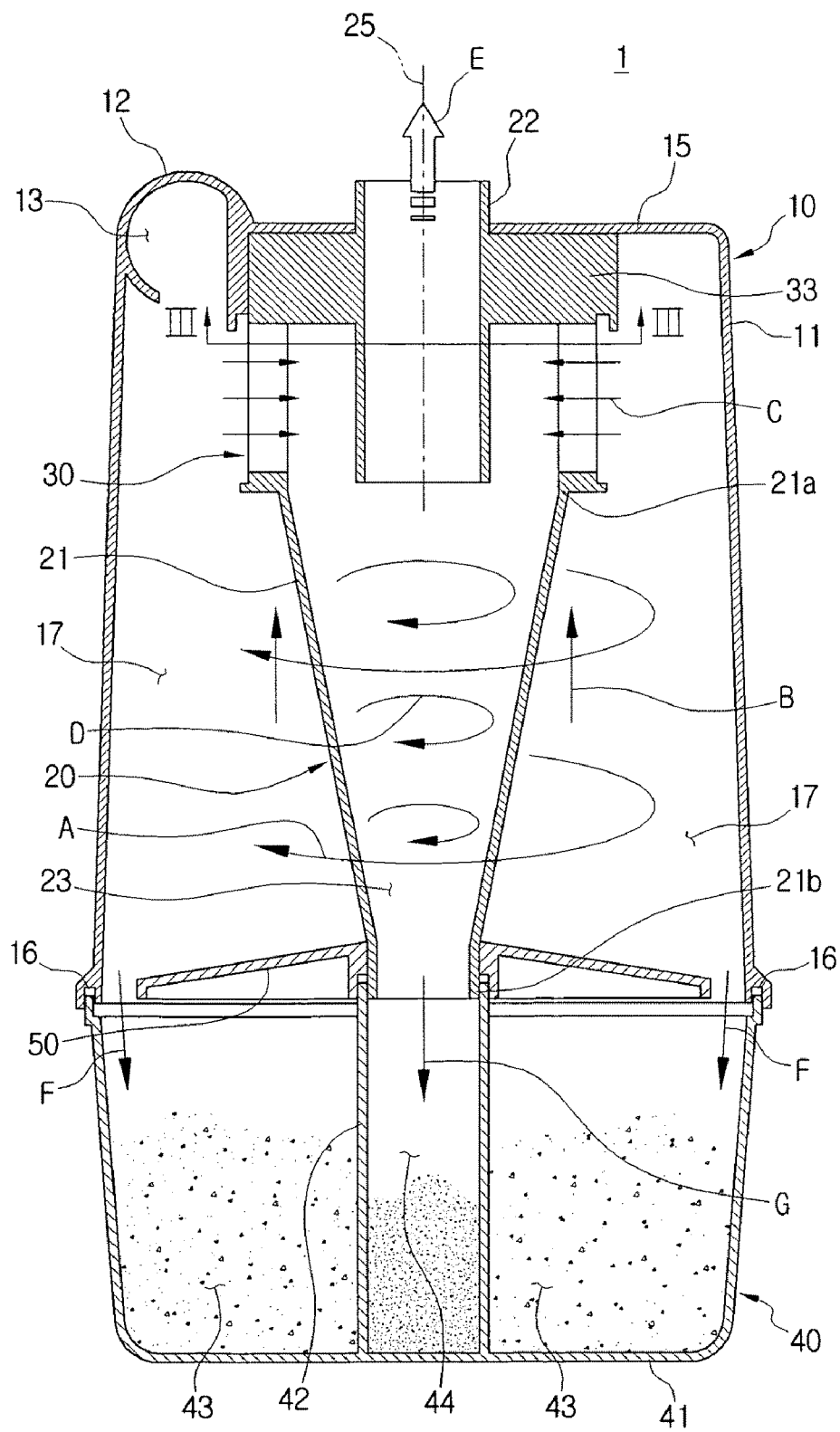
FIG. 2 is a sectional view illustrating the cyclone dust collecting apparatus of FIG. 1.

Referring to FIGS. 1 and 2, a cyclone dust collecting apparatus 1 for a vacuum cleaner according to the first embodiment of the present disclosure includes a first cyclone 10, a second cyclone 20, and a dust collecting receptacle 40.

The first cyclone 10 draws-in outside air containing dust, dirt, and so on (hereinafter, referred to as dust-laden air), and forces the dust-laden air to downwardly whirl inside the first cyclone 10 so that dust, dirt and so on (hereinafter, referred to as dust) is separated from the dust-laden air by centrifugal force. Then, the first cyclone 10 discharges air having dust partially removed (hereinafter, referred to as semi-clean air) to the second cyclone 20.

The first cyclone 10 has a first cyclone body 11 and an air suction pipe 12. The first cyclone body 11 is formed in a substantially hollow cylindrical shape with a top end closed by a top wall 15 and an opened bottom end. At an upper side of the first cyclone body 11 is formed an air suction hole 13 through which the dust-laden air is drawn-in. Preferably, the air suction hole 13 is disposed at a higher level than an air guiding member 30 described below. The bottom end of the first cyclone body 11 is in fluid communication with the dust collecting receptacle 40. The first cyclone body 11 has a length that is long enough to form a whirling space 17 in which the drawn-in dust-laden air can whirl downwardly. In other words, the first cyclone body 11 has the whirling space 17 of the dust-laden air between the air guiding member 30 and a backflow preventing member 50 described below.

The air suction pipe 12 is disposed at the upper side of the first cyclone 10, namely, at a place corresponding to the air suction hole 13 of the first cyclone body 11, and is disposed in a substantially tangential direction to the first cyclone body 11. Also, the air suction pipe 12 is downwardly inclined with respect to the first cyclone body 11 so as to force the dust-laden air drawing-in inside the first cyclone body 11 to form a first downwardly whirling air current that the dust-laden air whirls downwardly. In other words, the air suction pipe 12 is disposed at the upper side of the first cyclone body 11 such that an entrance 14 of the air suction pipe 12 is higher than an exit thereof. The exit of the air suction pipe 12 corresponds to the air suction hole 13 of the first cyclone body 11.

The second cyclone 20 is disposed inside the first cyclone 10, draws-in the semi-clean air discharged from the first cyclone 10, and forces the semi-clean air to form a second whirling air current. Then, fine dust remaining in the semi-clean air discharged from the first cyclone 10 is separated by the centrifugal force caused by the second whirling air current. At this time, the size of the second cyclone 20 is smaller than the size of the first cyclone 10 so that the second cyclone 20 can remove fine dust that has not been separated in the first cyclone 10.

The second cyclone 20 has a second cyclone body 21, an air guiding member 30, and an air-discharging pipe 22. The second cyclone body 21 is formed in a substantially hollow cylindrical shape with opened opposite ends 21a and 21b. An opened top end 21a and opened bottom end 21b are in fluid communication with the air guiding member 30 and the dust collecting receptacle 40, respectively. The semi-clean air entering through the air guiding member 30 forms the second downwardly whirling air current in a space 23 inside the second cyclone body 21. Referring to FIG. 2, the second cyclone body 21 has a substantially conical shape such that a diameter of the second cyclone body 21 decreases from the top end 21a thereof to the bottom end 21b thereof. In other words, a diameter of the top end 21a of the second cyclone body 21 is larger than a diameter of the bottom end 21b thereof. Alternatively, although not shown, the second cyclone body 21 can be formed in a substantially hollow cylindrical shape.

The air guiding member 30 is disposed on a bottom surface of the top wall 15 of the first cyclone body 11. The second cyclone body 11 is connected to a bottom end of the air guiding member 30. The air guiding member 30 simultaneously functions as an air discharging opening of the first cyclone 10 and an air entering opening of the second cyclone 20. In other words, the semi-clean air discharged from the first cyclone 10 directly enters inside the second cyclone 20 via the air guiding member 30.

Figure 3:
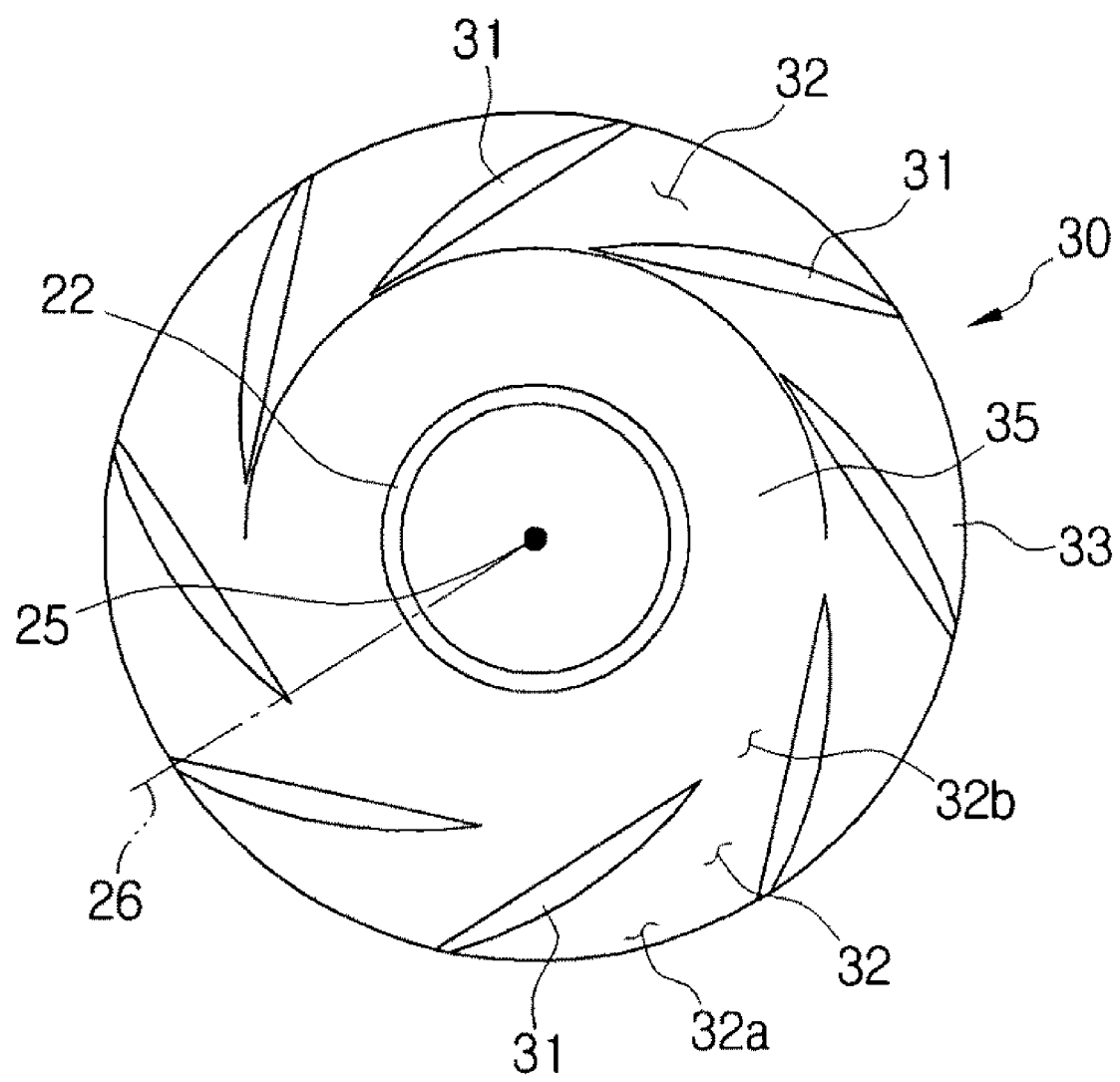
FIG. 3 is a sectional view illustrating the cyclone dust collecting apparatus of FIG. 2, taken along a line III-III in FIG. 2.

The air guiding member 30 has a base 33 and a plurality of guiding blades 31. Referring FIG. 3, the plurality of guiding blades 31 radially arranged in a circular shape based on a vertical axis 25 of the second cyclone 20. Spaces defined between the pluralities of guiding blades 31 form a plurality of slots 32 for the semi-clean air to be drawn-in. An entrance 32a of each of the plurality of slots 32 is equivalent to the air discharging opening of the first cyclone 10, and an exit 32b of each of the plurality of slots 32 is equivalent to the air entering opening of the second cyclone 20. Therefore, the air discharging opening, through which the semi-clean air is discharged from the first cyclone 10, and the air entering opening, through which the semi-clean air enters the second cyclone 20, comprise a plurality of air discharging openings and air entering openings, respectively. The air discharging opening is disposed at the same level as the air entering opening. Also, each of the plurality of guiding blades 31 is disposed to be inclined with respect to a straight line 26 joining a center of the air guiding member 30, namely, the vertical axis 25 of the second cyclone 20 as shown in FIG. 3. A section of the guiding blade 31 is formed in a substantially streamline shape. In other words, the air guiding member 30 has a substantially similar structure and shape to those of general impellers. As a result, the semi-clean air entering inside the second cyclone 20 through the plurality of guiding blades 31 forms the second whirling air current.

Figure 4A:
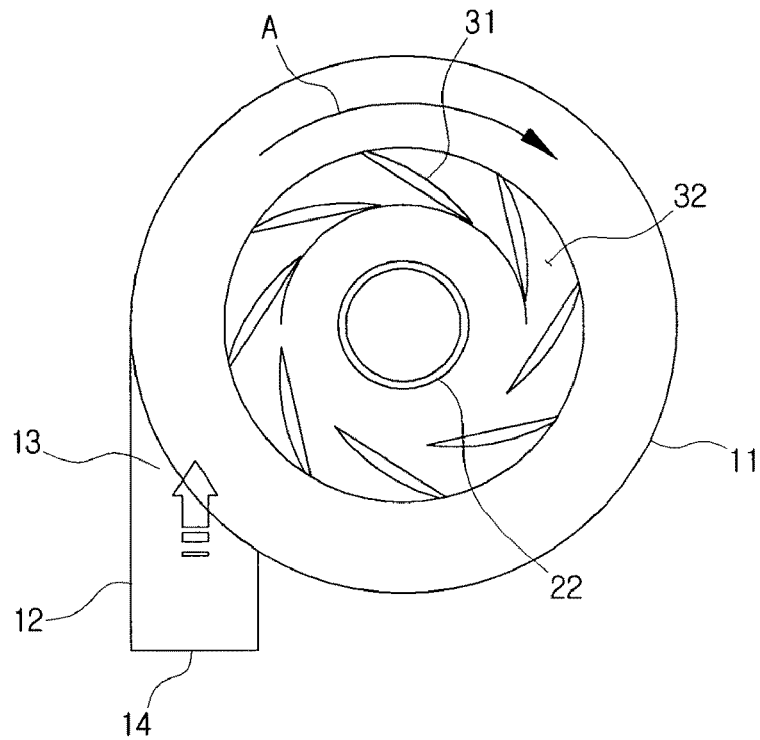
FIGS. 4A and 4B are concept views illustrating an arrangement of a plurality of guiding blades according to a direction in which the dust-laden air whirls in the cyclone dust collecting apparatus of FIG. 1 according to the first embodiment of the present disclosure.
Figure 4B:
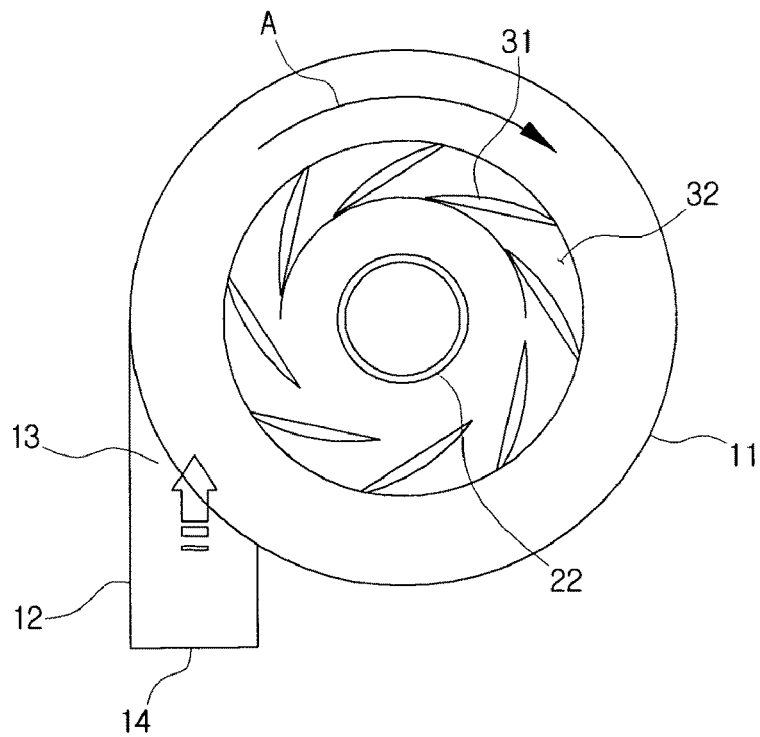

The number of the plurality of guiding blades 31 can be variously determined, but the air guiding member 30 preferably has four or more guiding blades 31. Furthermore, the plurality of guiding blades 31 are variously arranged, but, preferably, the plurality of guiding blades 31 are radially arranged by regular angular intervals based on the vertical axis 25 of the second cyclone 20. In this embodiment, eight guiding blades 31 are radially arranged by regular angular intervals. Also, each of the plurality of guiding blades 31 may be disposed to be inclined in a direction identical with or in a direction opposite to the direction in which the dust-laden air entering the first cyclone 10 whirls inside the first cyclone 10 as shown in FIGS. 4A and 4B. FIG. 4A shows the plurality of guiding blades 31 inclined in the same direction to the whirling direction A of the dust-laden air. FIG. 4B shows the plurality of guiding blades 31 inclined in the opposite direction to the whirling direction A of the dust-laden air. In the cyclone dust collecting apparatus 1 according to the first embodiment of the present disclosure, the dust collecting efficiency and the pressure loss varies according to the number, shapes, and arranging directions of the plurality of guiding blades 31. Preferably, the number, shapes, and arranging directions of the plurality of guiding blades 31 are determined according to the use and/or purpose of the cyclone dust collecting apparatus 1.

The plurality of guiding blades 31 is fixed on the base 33. An inclined surface 35 is formed at an inner area of the base 33 surrounded by the plurality of guiding blades 31. The inclined surface 35 is downwardly inclined so that the semi-clean air entering through the plurality of slots 32 between the pluralities of guiding blades 31 forms the second downwardly whirling air current.

The air discharging pipe 22 is disposed at a center of the base 33 of the air guiding member 30, and is formed in a substantially hollow cylindrical shape with opened opposite ends. The opened top end is in fluid communication with a vacuum generator (not shown), and the opened bottom end is in fluid communication with the inner space 23 of the second cyclone body 21, namely, the space 23 where the second downwardly whirling air current is formed. Therefore, the air discharging pipe 22 discharges cleaned air having fine dust removed in the second cyclone 20 in a direction opposite to the gravity direction. Preferably, the bottom end of the air-discharging pipe 22 extends to the same level as the bottom end of the air guiding member 30, or to a lower level than the bottom end of the air guiding member 30.

On the other hand, the second cyclone body 21, the air guiding member 30, and air-discharging pipe 22 composing the second cyclone 20 is preferably molded as a single piece. As a result, the number of parts and the manufacturing cost of the cyclone dust collecting apparatus 1 are decreased. Furthermore, preferably, the second cyclone 20 is detachably disposed at the first cyclone 10.

The dust collecting receptacle 40 is disposed below the first cyclone body 11, and collects dust discharged from the first cyclone 10 and the second cyclone 20. The dust collecting receptacle 40 is formed in a substantially hollow cylindrical shape with an opened top end and a bottom end closed by a bottom wall 41. A partition wall 42 is formed at a center of the bottom wall 41 of the dust collecting receptacle 40. The partition wall 42 has a substantially hollow cylindrical shape with a diameter corresponding to the bottom end 21b of the second cyclone body 21. Accordingly, the dust collecting receptacle 40 is partitioned into two spaces 43 and 44 by the partition wall 42. An outer space 43 of the partition wall 42 forms a first dust collecting chamber, and an inner space 44 of the partition wall 42 forms a second dust collecting chamber. The first dust collecting chamber 43 collects dust discharged from the first cyclone 10, and the second dust collecting chamber 44 collects fine dust discharged from the second cyclone 20. A first connecting part 16 with a groove shape is formed at the bottom end of the first cyclone body 11 so that the top end of the dust collecting receptacle 40 is inserted into the first connecting part 16. A sealing member (not shown) may be disposed inside the first connecting part 16 so that the first dust collecting chamber 43 is hermetically sealed to the outside. The sealing member may be made of a rubber material with a ring shape. The bottom end 21b of the second cyclone body 21 is formed such that a top end of the partition wall 42 can be inserted into the bottom end 21b of the second cyclone body 21. As a result, when the top end of the dust collecting receptacle 40 is inserted into the first connecting part 16, the bottom end 21b of the second cyclone body 21 is inserted into the top end of the partition wall 42. When the dust collecting receptacle 40 is inserted into the first connecting part 16 and the bottom end 21b of the second cyclone body 21 is inserted into the top end of the partition wall 42, the first dust collecting chamber 43 is not in fluid communication with the outside and the second dust collecting chamber 44 is not in fluid communication with the first dust collecting chamber 41.

Furthermore, a backflow preventing member 50 is preferably disposed between the first cyclone body 11 and the dust collecting receptacle 40 so as to prevent dust collected in the first dust collecting chamber 43 from re-scattering and flowing back to the first cyclone body 11. The backflow preventing member 50 is disposed at the second cyclone 20. The height at which the backflow preventing member 50 is disposed determines the size of the whirling space 17 in which the dust laden air whirls, and the volume of the dust collecting receptacle 40. In this embodiment, the backflow preventing member 50 is disposed at a lower portion of the second cyclone body 21 as shown in FIG. 2. Also, the backflow preventing member 50 is formed in a substantially conical shape, and has a smaller diameter than an inner diameter of the bottom end of the first cyclone body 11 so that dust separated at the first cyclone 10 can fall into the dust collecting receptacle 40. At this time, the backflow preventing member 50 is preferably made of an elastic material such as a rubber. As a result, relatively large and heavy dust such as cigarette butts, bottle caps, and so on can fall into the dust collecting receptacle 40 through a gap between the backflow preventing member 50 and the inner surface of the first cyclone body 11, and the backflow preventing member 50 can prevent the dust collected in the dust collecting receptacle 40 from re-scattering.

Hereinafter, operation and function of the cyclone dust collecting apparatus 1 for a vacuum cleaner according to the first embodiment of the present disclosure with the above-described structure is explained with reference to FIGS. 1 to 4B.

Upon turning on the vacuum cleaner, a vacuum generator (not shown) is operated to generate suction force. Dust-laden air is drawn-in into the air suction pipe 12 of the first cyclone 10 by the suction force. The air suction pipe 12 is downwardly inclined in a tangential direction to the upper side of the first cyclone body 11 so that the dust-laden air passes through the air suction pipe 12 and forms the first downwardly whirling air current A in the space 17 inside the first cyclone body 11. Then, dust is separated from the dust-laden air by centrifugal force caused by the first downwardly whirling air current A. The separated dust F falls along the inner surface of the first cyclone body 11, and then, is collected in the first dust collecting chamber 43 of the dust collecting receptacle 40 through the gap between the backflow preventing member 50 and the inner surface of the first cyclone body 11. Because the backflow preventing member 50 is made of elastic material, heavy dust with a larger size than the size of the gap between the backflow preventing member 50 and the first cyclone body 11 such as bottle caps, cigarette butts, and so on can pass through the backflow preventing member 50 so as to be collected in the dust collecting receptacle 40.

The semi-clean air B having dust separated rises to enter the plurality of slots 32 of the air guiding member 30. The semi-clean air C passed through the plurality of slots 32 enters the second cyclone 20. At this time, the plurality of slots 32 are formed by the plurality of inclined guiding blades 31, and the air guiding member 30 has the inclined surface 35 on the base 33 thereof so that the semi-clean C air passed through the plurality of slots 32 forms the second downwardly whirling air current D in the space 23 inside the second cyclone body 21. Then, fine dust remaining in the semi-clean air is separated by centrifugal force caused by the second downwardly whirling air current D. The separated fine dust G falls and is collected in the second dust collecting chamber 44. Cleaned air E having fine dust removed re-rises to enter the air discharging pipe 22 disposed at a center of the air guiding member 30. The cleaned air E entering the air discharging pipe 22 passes through the vacuum generator (not shown), and then, is discharged outside the cleaner body (not shown).

Hereinafter, a cyclone dust collecting apparatus 2 for a vacuum cleaner according to the second embodiment of the present disclosure is explained with reference to FIGS. 5 to 8D.

Figure 5:
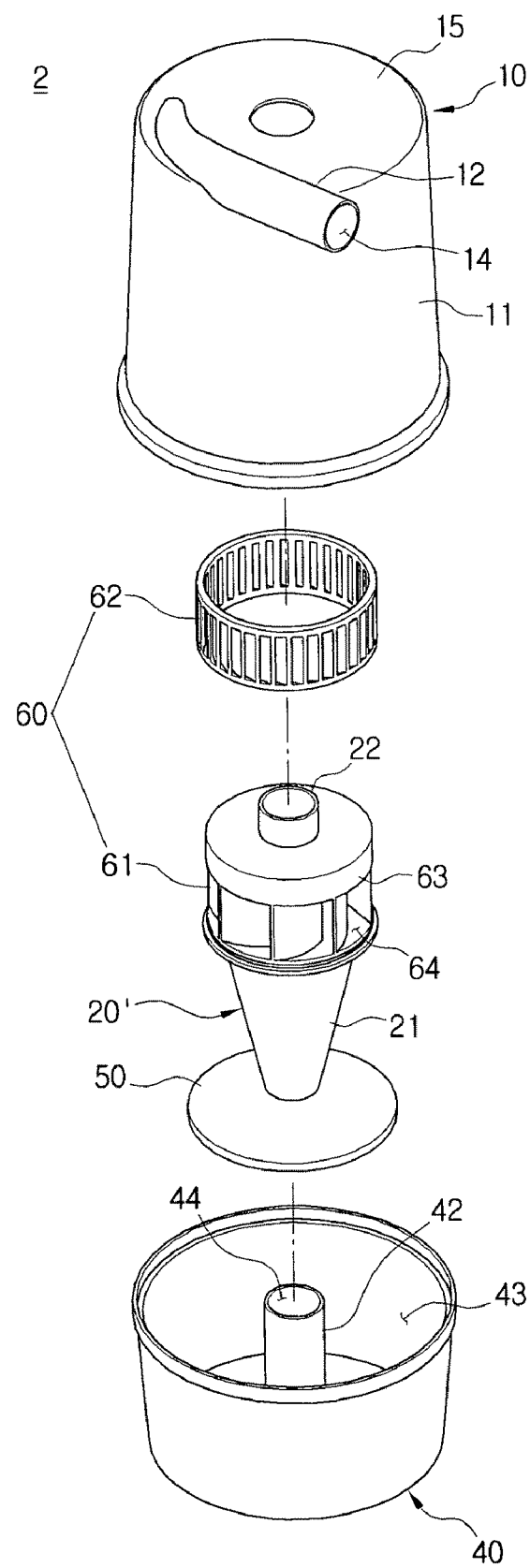
FIG. 5 is an exploded perspective view illustrating a cyclone dust collecting apparatus for a vacuum cleaner according to the second embodiment of the present disclosure.
Figure 6:
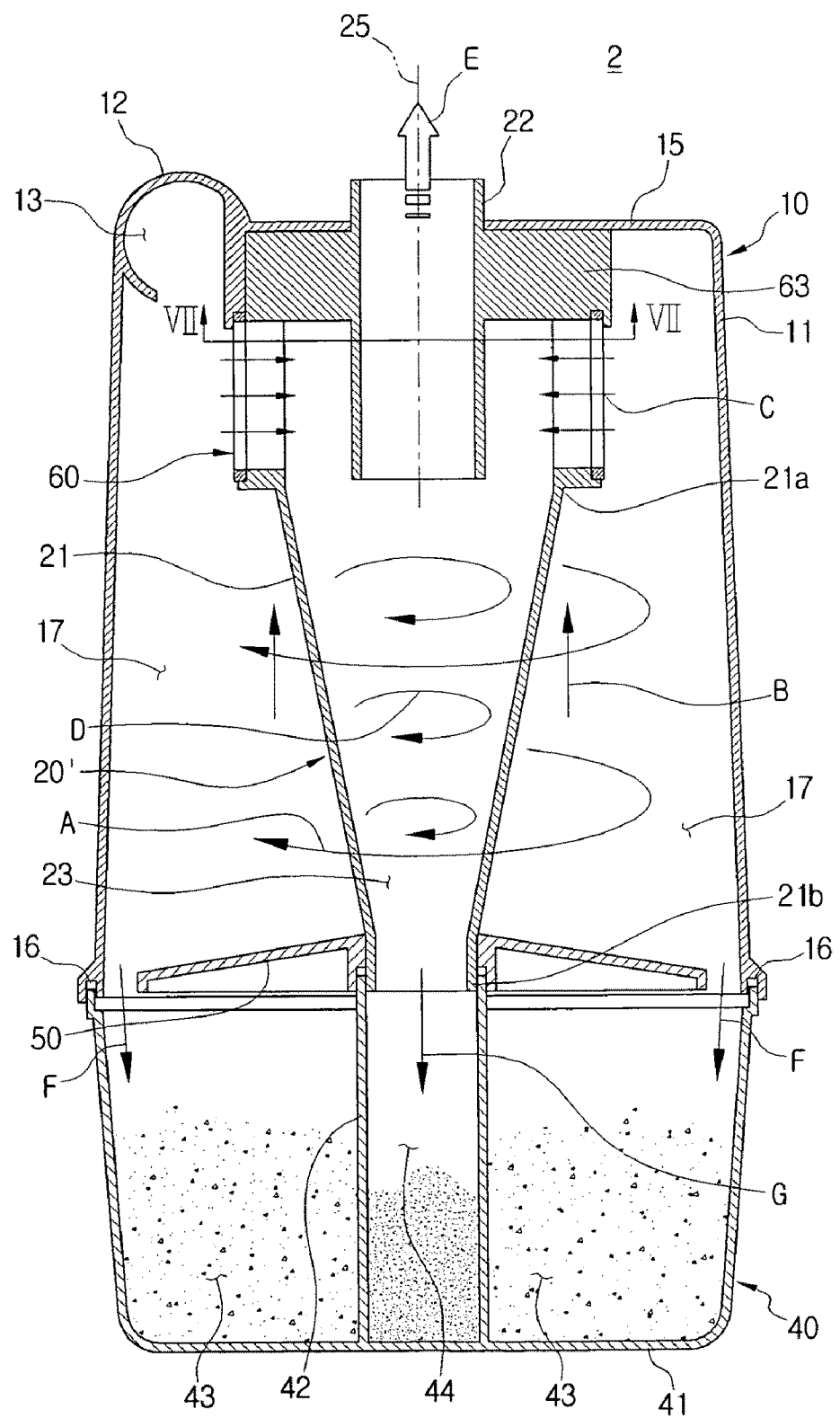
FIG. 6 is a sectional view illustrating the cyclone dust collecting apparatus of FIG. 5.

Referring to FIGS. 5 and 6, a cyclone dust collecting apparatus 2 for a vacuum cleaner according to the second embodiment of the present disclosure includes a first cyclone 10, a second cyclone 20', and a dust collecting receptacle 40.

The cyclone dust collecting apparatus 2 according to the second embodiment has the same first cyclone 10 and dust collecting receptacle 40 as those of the cyclone dust collecting apparatus 1 according to the first embodiment as described above except the second cyclone 20'. Therefore, the second cyclone 20' is only described hereinafter.

The second cyclone 20' is disposed inside the first cyclone 10, takes the semi-clean air C discharged from the first cyclone 10, and forces the semi-clean air C to form the second downwardly whirling air current D. Then, fine dust is separated from the semi-clean air C discharged from the first cyclone 10 by centrifugal force caused by the second downwardly whirling air current D.

The second cyclone 20' includes a second cyclone body 21, an air guiding member 60, and an air discharging pipe 22. The air guiding member 60 is disposed on a bottom surface of the top wall 15 of the first cyclone body 11. A bottom end of the air guiding member 60 is connected to the second cyclone body 21. The air guiding member 60 simultaneously functions as an air discharging opening of the first cyclone 10 and an air entering opening of the second cyclone 20'. In other words, the semi-clean air discharged from the first cyclone 10 directly enters inside the second cyclone 20' via the air guiding member 60. The air guiding member 60 has a base 63 and a plurality of guiding blades 61 and 62.

Figure 7:
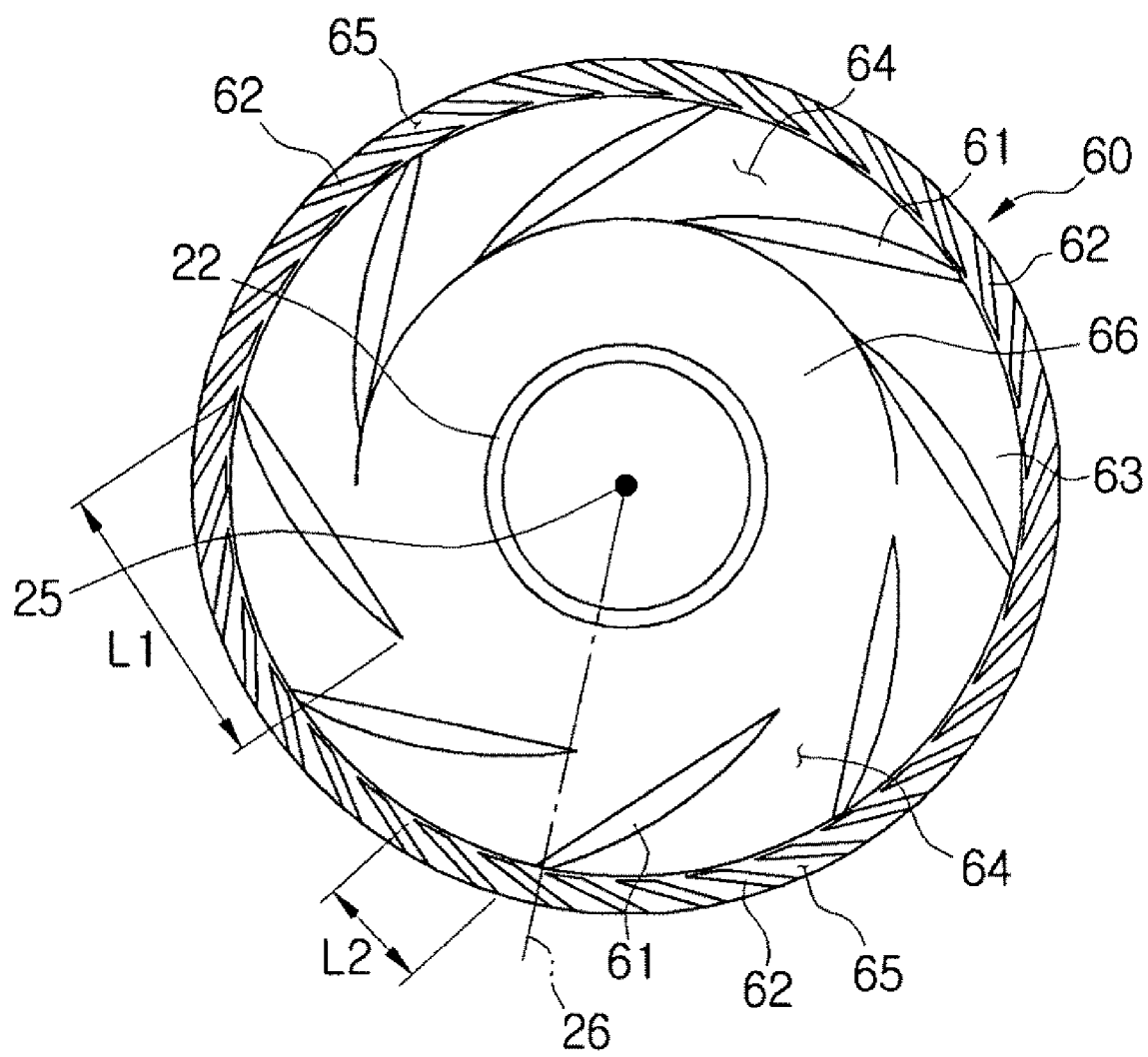
FIG. 7 is a sectional view illustrating the cyclone dust collecting apparatus of FIG. 6, taken along a line VII-VII in FIG. 6.

The plurality of guiding blades 61 and 62 is radially arranged in a circular shape based on a vertical axis 25 of the second cyclone 20'. In present embodiment, the plurality of guiding blades 61 and 62 is arranged in two concentric circles based on the vertical axis 25 of the second cyclone 20' as shown in FIG. 7. Although the plurality of guiding blades 61 and 62 according to this embodiment is arranged in two concentric circles, this is for illustrative purposes only. Alternatively, the plurality of guiding blades 61 and 62 may be arranged in three or more concentric circles. In this embodiment, the plurality of guiding blades 61 forming an inner circle is referred to as first guiding blades, and the plurality of guiding blades 62 forming an outer circle is referred to as second guiding blades. The first and second guiding blades 61 and 62 of the air guiding member 60 is integrally molded with the second cyclone body 21 and the air discharging pipe 22. Alternatively, as shown in FIG. 6, the plurality of second guiding blades 62 is molded as a separate part with a ring shape, and the plurality of first guiding blades 61 is integrally molded with the second cyclone body 21 and the air discharging pipe 22. Then, the plurality of second guiding blades 62 is mounted at the outside of the first guiding blades 61, thereby forming the air guiding member 60.

Referring to FIG. 7, spaces defined between the pluralities of first and second guiding blades 61 and 62 form a plurality of first and second slots 64 and 65 for semi-clean air to pass through. An entrance of each of the plurality of first slots 64 is equivalent to the air discharging opening of the first cyclone 10, and an exit of each of the plurality of second slots 65 is equivalent to the air entering opening of the second cyclone 20'. Therefore, the semi-clean air is discharged through the plurality of air discharging openings from the first cyclone 10, and enters the second cyclone 20' through the plurality of air entering openings. The plurality of air discharging openings is disposed at the same level as the plurality of air entering openings. Also, each of the plurality of first and second guiding blades 61 and 62 is disposed to be inclined with respect to a straight line 26 joining a center of the air guiding member 60, namely, the vertical axis 25 of the second cyclone 20' as shown in FIG. 7. Preferably, the number of the second guiding blades 62 is larger than the number of the first guiding blades 61. For examples, when the number of the first guiding blades 61 is four, six, eight, and ten, the number of the second guiding blades 62 corresponding to the first guiding blades 61 is 38, 40, 42, and 44, respectively. Furthermore, the length L2 of each of the second guiding blades 62 is preferably shorter than the length L1 of each of the first guiding blades 61. As a result, the second guiding blades 62 filter dust entering the air guiding member 60 with the semi-clean air discharged from the first cyclone 10. In other words, the second guiding blades 62 serve as a filter filtering semi-clean air discharged from the first cyclone 10 to the second cyclone 20'. The first guiding blades 61 force the semi-clean air passing through them to form a whirling air current. Accordingly, the semi-clean air passing through the air guiding member 60 forms the second downwardly whirling air current inside the second cyclone 20'.

Figure 8A:
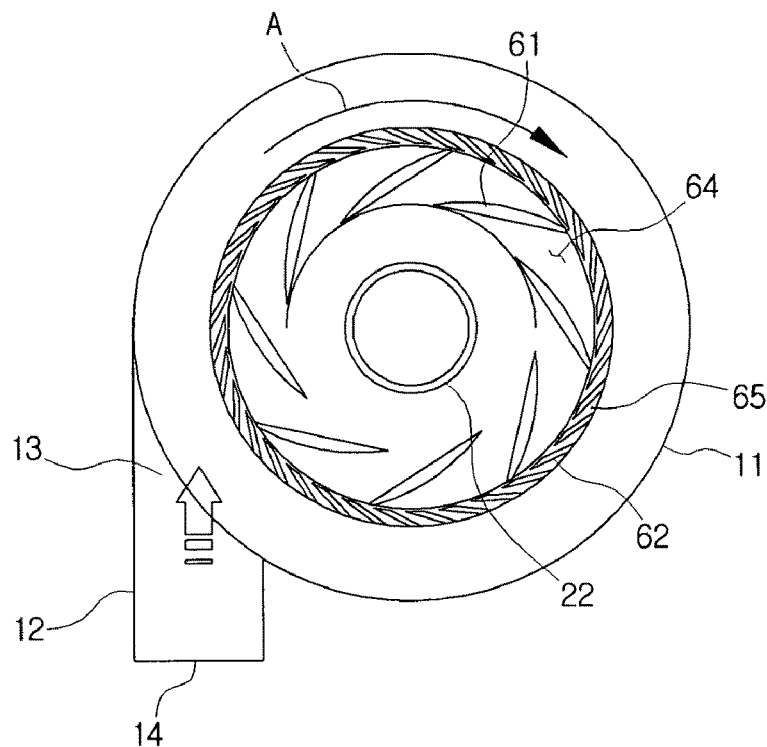
FIGS. 8A to 8D are concept views illustrating an arrangement of a plurality of first and second guiding blades according to a direction in which the dust-laden air whirls in the cyclone dust collecting apparatus of FIG. 5 according to the second embodiment of the present disclosure.
Figure 8B:
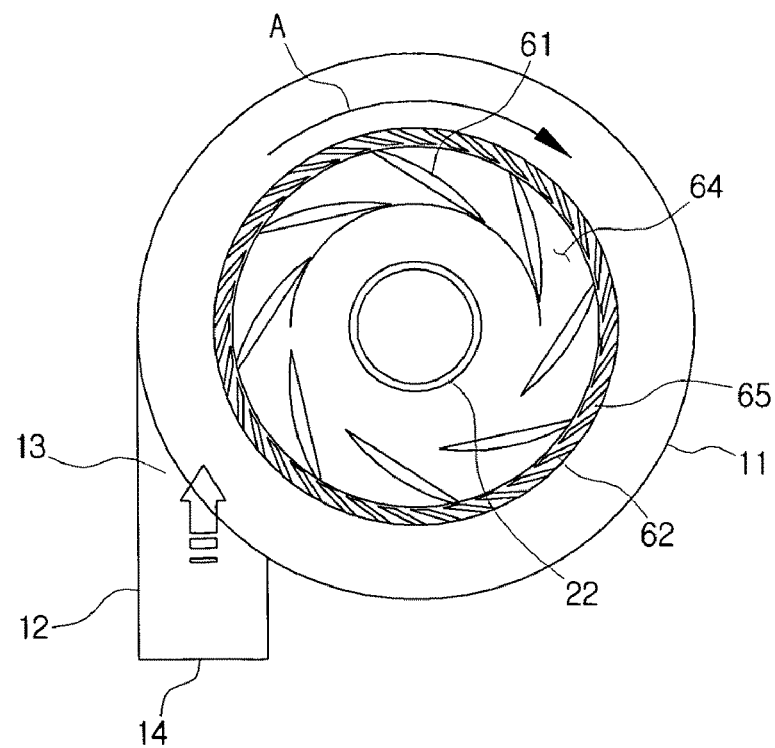
Figure 8C:
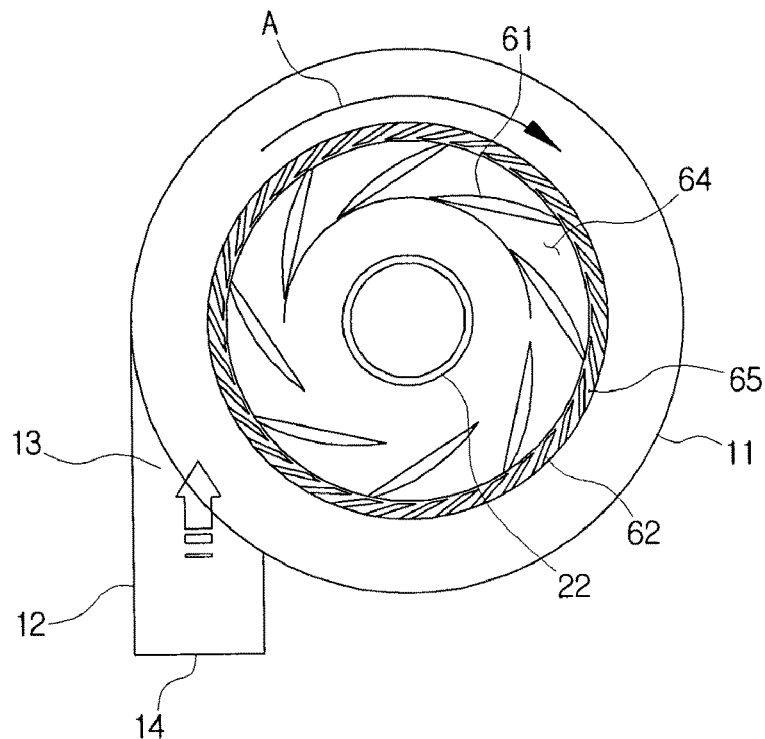
Figure 8D:
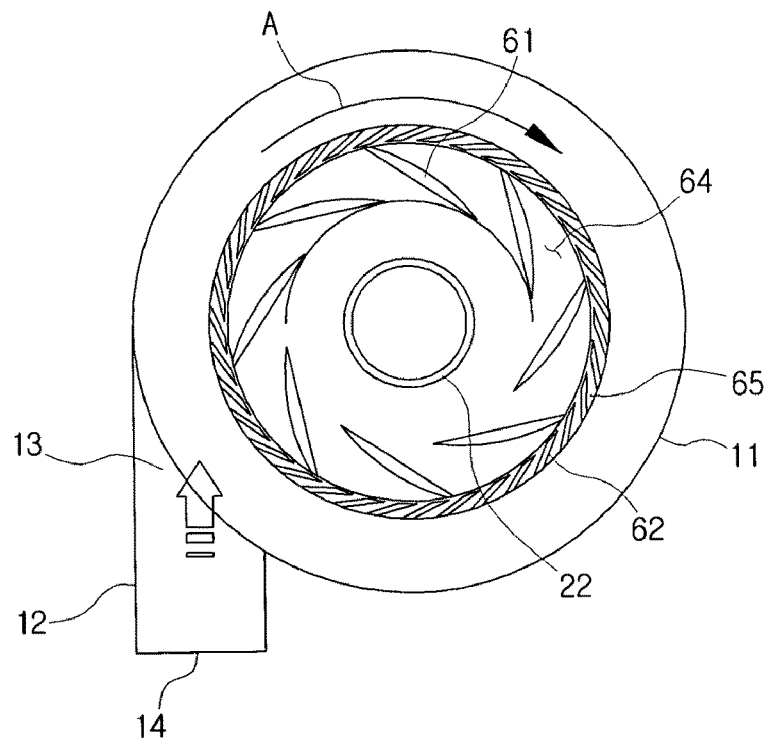

The plurality of first and second guiding blades 61 and 62 can be arranged in various methods. However, preferably, the first and second guiding blades 61 and 62 are radially arranged by regular angular intervals with respect to the vertical axis 25 of the second cyclone 20'. In this embodiment, eight (8) first guiding blades 61 are radially disposed by regular angular intervals, and forty (40) second guiding blades 62 are radially disposed by regular angular intervals outside the first guiding blades 61. Also, each of the plurality of first and second guiding blades 61 and 62 is inclined in a direction identical with or in a direction opposite to the direction A in which the dust-laden air entering the first cyclone 10 whirls in the first cyclone 10. FIGS. 8A to 8D show examples of the air guiding member 60 according to the inclined direction of the first and second guiding blades 61 and 62. FIG. 8A shows an air guiding member 60 having the plurality of outside second guiding blades 62 inclined in the same direction to the whirling direction A of the dust-laden air, and the plurality of inside first guiding blades 61 inclined in the opposite direction to the whirling direction A of the dust-laden air. FIG. 8B shows an air guiding member 60 having the plurality of first and second guiding blades 61 and 62 inclined in the same direction to the whirling direction A of the dust-laden air. FIG. 8C shows an air guiding member 60 having the plurality of first and second guiding blades 61 and 62 disposed in the opposite direction to the whirling direction A of the dust-laden air. FIG. 8D shows an air guiding member 60 having the plurality of second guiding blades 62 inclined in the opposite direction to the whirling direction A of the dust-laden air, and the plurality of first guiding blades 61 inclined in the same direction to the whirling direction A of the dust-laden air. Table 1 shows the dust collecting efficiency and pressure loss of the cyclone dust collecting apparatus 2 for a vacuum cleaner having each of the above-described air guiding members 60.

TABLE 1

| Arrangement of the guiding blades | Dust collecting efficiency (%) | Pressure loss (mmH$_2$O) |
|---|---|---|
| FIG. 8B | 94.85 | 115 |
| FIG. 8C | 95.8 | 116 |
| FIG. 8D | 96.0 | 175 |

Referring to Table 1, the dust collecting efficiency and the pressure loss of the cyclone dust collecting apparatus 2 according to the second embodiment of the present disclosure vary according to the arrangement of the first and second guiding blades 61 and 62. Furthermore, the dust collecting efficiency of the dust collecting apparatus 2 varies according to the number and shapes of the first and second guiding blades 61 and 62. Therefore, the number, shapes, and arranging directions of the plurality of first and second guiding blades 61 and 62 are preferably determined according to the use and/or purpose of the cyclone dust collecting apparatus 2.

The plurality of first guiding blades 61 is fixed on the base 63. An inclined surface 66 is formed on an inner area of the base 63 surrounded by the plurality of first guiding blades 61. The inclined surface 63 is downwardly inclined so that the semi-clean air entering through the plurality of first slots 64 between the pluralities of first guiding blades 61 forms a second downwardly whirling air current. The plurality of second guiding blades 62 is integrally formed with the base 63. Alternatively, the second guiding blades 62 are formed in a separate part so as to be mounted outside the first guiding blades 61. The base 63 forms a top surface of the second cyclone 20'.

The second cyclone body 21 and air-discharging pipe 22 according to this embodiment is the same as those of the cyclone dust collecting apparatus 1 according to the first embodiment of the present disclosure, and therefore, detailed descriptions thereof are omitted.

Furthermore, operation and function of the cyclone dust collecting apparatus 2 according to this embodiment are substantially the same as those of the cyclone dust collecting apparatus 1 according to the first embodiment, and therefore, detailed descriptions thereof are omitted. However, there is one exception that the plurality of second guiding blades 62 filters dust moving with the semi-clean air, which is discharged from the first cyclone body 11 to the air guiding member 60, and the plurality of first guiding blades 61 forces the semi-clean air passed the air guiding member 60 to form the whirling air current.

Hereinafter, a cyclone dust collecting apparatus 3 for a vacuum cleaner according to the third embodiment of the present disclosure is described with reference to FIGS. 9 and 10.

Figure 9:
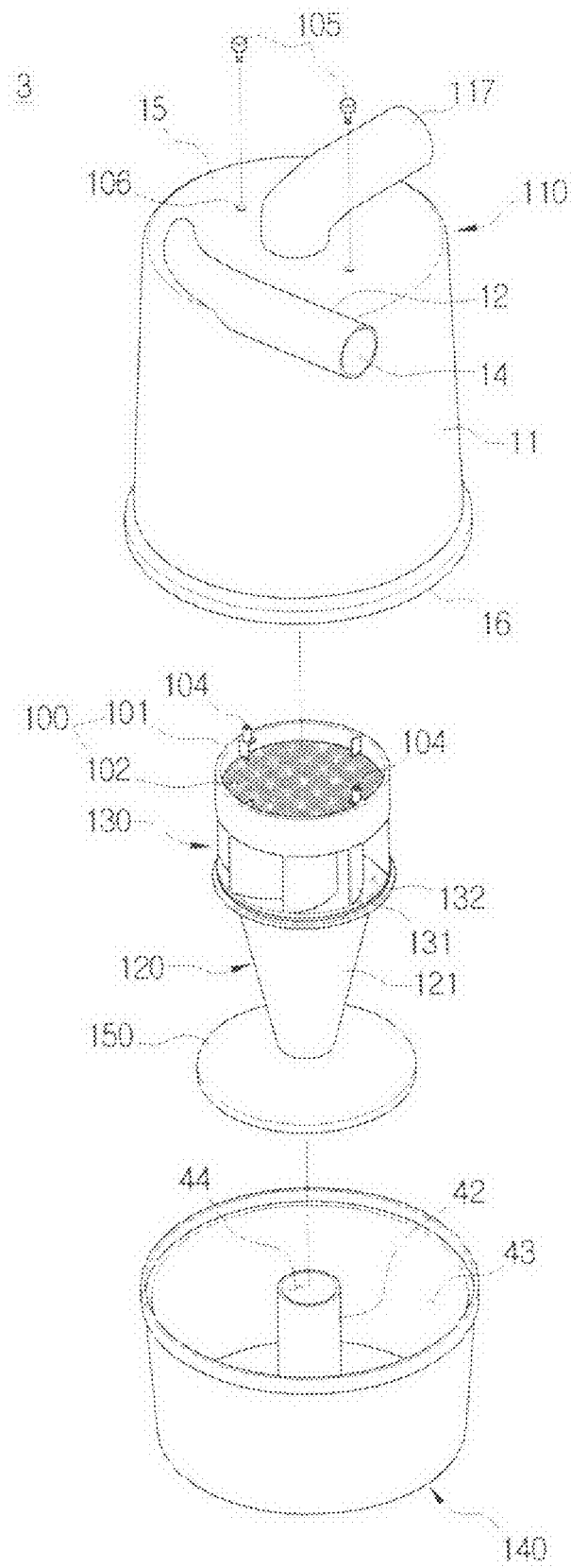
FIG. 9 is an exploded perspective view illustrating a cyclone dust collecting apparatus for a vacuum cleaner according to the third embodiment of the present disclosure.
Figure 10:
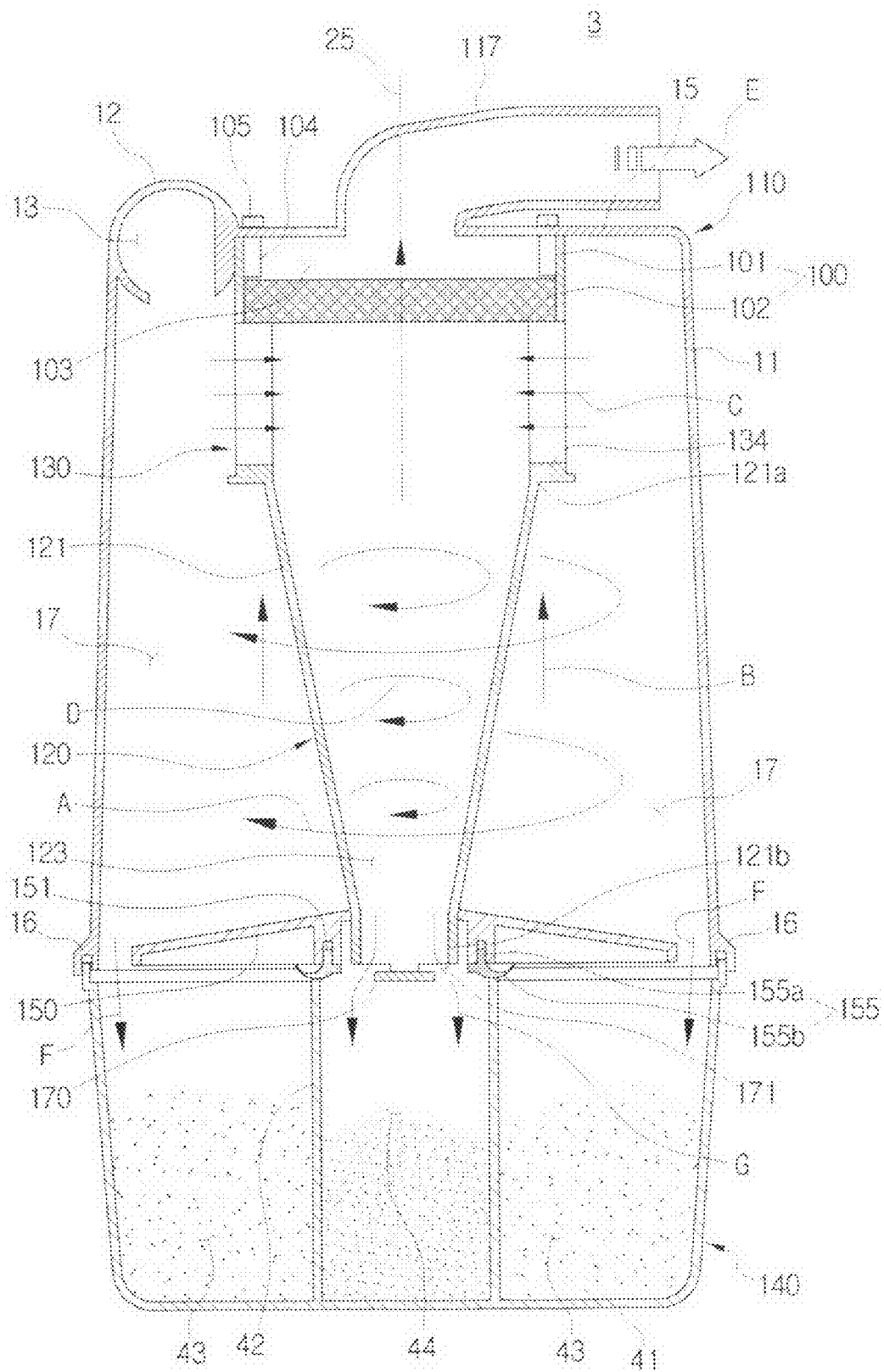
FIG. 10 is a sectional view illustrating the cyclone dust collecting apparatus of FIG. 9.

Referring to FIGS. 9 and 10, a cyclone dust collecting apparatus 3 for a vacuum cleaner according to the third embodiment of the present disclosure includes a first cyclone 110, a second cyclone 120, a filtering member 100, and a dust collecting receptacle 140.

The first cyclone 110 is substantially the same as the first cyclone 10 of the cyclone dust collecting apparatus 1 according to the first embodiment, exception that the air-discharging pipe 117 is disposed at a top wall 15 of the first cyclone body 11. The air-discharging pipe 117 discharges purified air E passed through the filtering member 100 to the vacuum generator (not shown).

The second cyclone 120 is disposed inside the first cyclone 110. The semi-clean air C discharged from the first cyclone 110 enters to form a second downwardly whirling air current D inside the second cyclone 120. Then, fine dust is separated from the semi-clean air by the centrifugal force caused by the second downwardly whirling air current D.

The second cyclone 120 includes a second cyclone body 121, and an air guiding member 130. The air guiding member 130 is disposed at a top end of the second cyclone body 121. The air guiding member 130 simultaneously functions as an air discharging opening through which the semi-clean air is discharged from the first cyclone 110 and an air entering opening through which the semi-clean air enters the second cyclone 120. In other words, the semi-clean air discharged from the first cyclone 110 directly enters inside the second cyclone 120 via the air guiding member 130. The air guiding member 130 has a bottom plate 134 and a plurality of guiding blades 131. The plurality of guiding blades 131 radially arranged on the bottom plate 134 in a circular shape based on a vertical axis 25 of the second cyclone 120. The plurality of guiding blades 131 is substantially the same as the guiding blades 31 of the cyclone dust collecting apparatus 1 according to the first embodiment, and therefore, a detailed description thereof is omitted.

The semi-clean air enters the second cyclone body 121 through the air guiding member 130, and then, whirls inside the second cyclone body 121. The second cyclone body 121 is the same as the second cyclone body 21 of the cyclone dust collecting apparatus 21 according to the first embodiment described above, and therefore, a detailed description thereof is omitted.

In this embodiment, the second cyclone body 121 is integrally formed with the air guiding member 130. Alternatively, although not shown, the air guiding member 130 is formed such that the air guiding member 130 can be detachably disposed to the second cyclone body 121. In other words, the second cyclone body 121 can be attachably/detachably coupled with a bottom end of the air guiding member 130 using a screw connection method in which a top end 121a of the second cyclone body 121 is formed as a male screw and the bottom end of the air guiding member 130 is formed as a female screw. Then, the second cyclone body 121 is turned in a direction so as to be separated from the air guiding member 130, and the second cyclone body 121 is turned an opposite direction so as to be coupled with the air guiding member 130. Alternatively, another one touch connection method can be used, in which guiding grooves are formed at any one of the top end of the second cyclone body 121 and the bottom end of the air guiding member 130, and fixing projections corresponding to the guiding grooves are formed at any one of the bottom end of the air guiding member 130 and the top end of the second cyclone body 121. When the fixing projections are inserted into the guiding grooves and turned, the second cyclone body 121 is coupled with the air guiding member 130. When the second cyclone body 121 is turned in the opposite direction and pulled, the second cyclone body 121 is separated from the air guiding member 130. Also, any known detachable connection method can be applicable to the methods for separating/coupling the second cyclone body 121 from/with the air guiding member 130.

The filtering member 100 filters cleaned air that has fine dust removed in the second cyclone 120 and is discharged to the vacuum generator. The filtering member 100 is disposed between the top wall 15 of the first cyclone body 110 and the top end of the second cyclone 120. In other words, the filtering member 100 is disposed at the upper side of the air guiding member 130 of the second cyclone 120. The filtering member 100 has a filter housing 101 and a filter 102.

The filter 102 filters fine dust moving with the cleaned air discharged from the second cyclone 120 so that purified air E is discharged to the vacuum generator. Accordingly, the filter 102 prevents fine dust from entering and damaging the vacuum generator. Preferably, the filter 102 comprises a porous material such as a sponge and so on.

The filter housing 101 has a substantially hollow cylindrical shape. The filter 102 is disposed at a lower portion of the inside of the filter housing 101 so that the filter 102 is formed in a substantially cylindrical shape corresponding to the filter housing 101. At this time, the height of the filter 102 is preferably lower than the height of the filter housing 101 so that a space 103 is formed between the filter 102 and the top wall 15 of the first cyclone body 11. A top end of the filter housing 101 is detachably disposed on the top wall 15 of the first cyclone body 11. In this embodiment, the filter housing 101 is fixed on the first cyclone body 11 using fixing members 105 such as screws and so on as shown in FIG. 9. In other words, a plurality of fixing parts 104, in which the fixing members 105 are fixed, is formed at an upper portion of the filter housing 101, and a plurality of fixing holes 106 corresponding to the fixing parts 104 is formed at the top wall 15 of the first cyclone body 11. As a result, the filter housing 101 is fixed at the first cyclone body 11 by the plurality of fixing members 105. Various connecting methods can be used for the filter member 100 to be detachably connected to the first cyclone 110 in addition to the above-described method. For an example, the above-described connecting method connecting the air guiding member 130 with the second cyclone body 121 can be used.

Furthermore, the filter housing 101 can be formed such that the filter housing 101 is detachably disposed at the air guiding member 130. At this time, a bottom end of the filter housing 101 and the top end of the air guiding member 130 can have the above-described connecting structure of the air guiding member 130 and the second cyclone body 121.

The dust collecting receptacle 140 is the same as the dust collecting receptacle 40 of the cyclone dust collecting apparatus 1 according to the first embodiment as described above, and therefore, a detailed description thereof is omitted.

Figure 11:
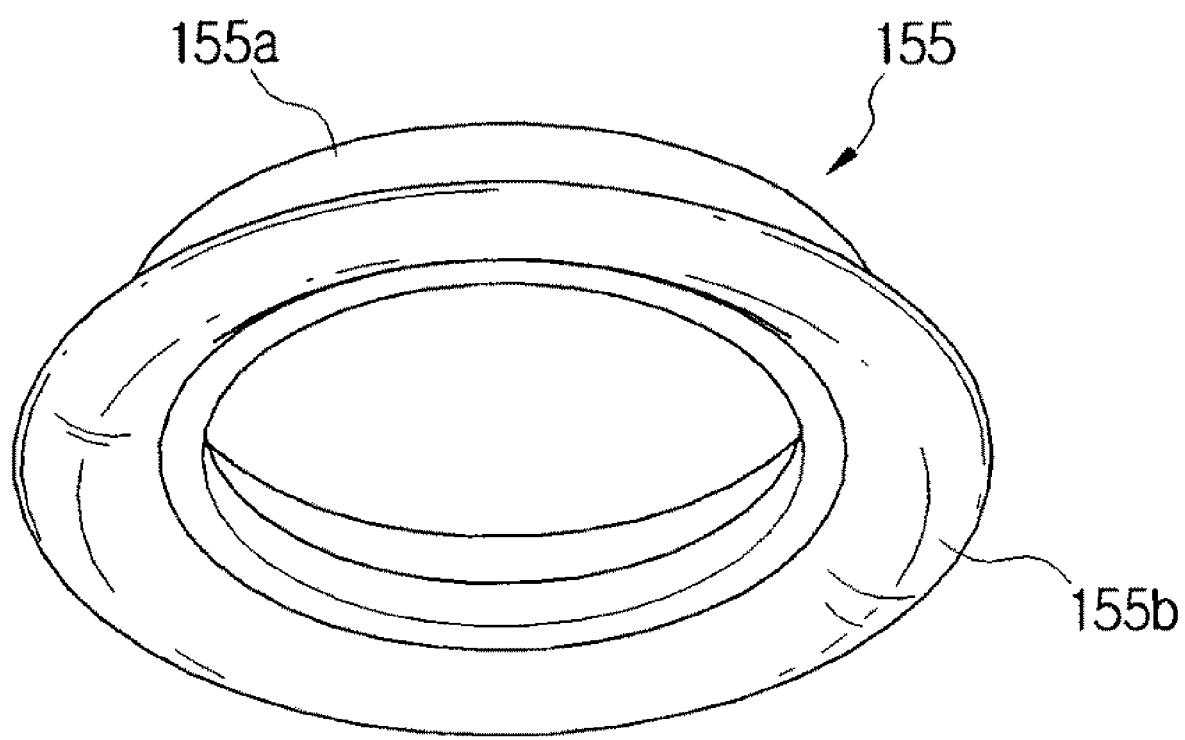
FIG. 11 is a perspective view illustrating a sealing member of FIG. 10.

A backflow preventing member 150 is disposed at a lower side of the second cyclone body 121 so as to prevent dust collected in the first dust collecting chamber 43 of the dust collecting receptacle 140 from re-scattering. A sealing member 155 is disposed at a bottom end of the backflow preventing member 150. The sealing member 155 seals the second dust collecting chamber 44 so that the second dust collecting chamber 44 is not in fluid communication with the first dust collecting chamber 43. The sealing member 155 is formed in a substantially ring shape corresponding to the partition wall 42 of the dust collecting receptacle 140 as shown in FIG. 11. A top end 155a of the sealing member 155 is fixed at a fixing groove 151 of the bottom end of the backflow preventing member 150, and a bottom end 155b of the sealing member 155 is formed in a shape that corresponds to the top end of the partition wall 42 and is rolled up by the partition wall 42. As a result, when the dust collecting receptacle 140 is inserted into the first connecting part 16 of the bottom end of the first cyclone body 11, the top end of the partition wall 42 pushes the sealing member 155 up so that the sealing member 155 seals the second dust collecting chamber 44. In other words, the airtightness between the first dust collecting chamber 43 and the second dust collecting chamber 44 is maintained or broken according to lifting or lowering of the dust collecting receptacle 140. When the sealing member 155 seals the second dust collecting chamber 44, the second downwardly whirling air current inside the second cyclone body 121 is not affected by the first downwardly whirling air current inside the first cyclone body 11.

Also, a dust cap 170 is disposed at the bottom end 121b of the second cyclone body 121 so as to prevent the fine dust collected in the second dust collecting chamber 44 from flowing back into the second cyclone body 121. The dust cap 170 is spaced apart from the bottom end 121b of the second cyclone body 121 by a predetermined distance so that fine dust separated in the second cyclone 120 can be discharged through a gap 171 between the dust cap 170 and the bottom end 121b of the second cyclone body 121.

Hereinafter, operation and function of the cyclone dust collecting apparatus 3 for a vacuum cleaner according to the third embodiment with the above-described structure is explained with reference to FIGS. 9 and 10.

Upon turning on the vacuum cleaner, a vacuum generator (not shown) is operated to generate suction force. Dust-laden air is drawn-in into the air suction pipe 12 of the first cyclone 110 by the suction force. The air suction pipe 12 is downwardly inclined in a tangential direction to the upper side of the first cyclone body 11 so that the dust-laden air passed through the air suction pipe 12 forms the first downwardly whirling air current A in the space 17 inside the first cyclone body 11. Then, dust is separated from the dust-laden air by centrifugal force caused by the first downwardly whirling air current A. The separated dust F falls along the inner surface of the first cyclone body 11, and then, is collected in the first dust collecting chamber 43 of the dust collecting receptacle 140 through the gap between the backflow preventing member 150 and the inner surface of the first cyclone body 11. Because the backflow preventing member 150 has the elasticity, heavy dust with a larger size than the size of the gap between the backflow preventing member 150 and the first cyclone body 11 such as bottle caps, cigarette butts, and so on can pass through the backflow preventing member 150, and is collected in the dust collecting receptacle 140.

The semi-clean air B having dust separated rises to enter the plurality of slots 132 of the air guiding member 130. The semi-clean air C passed through the plurality of slots 132 enters the second cyclone 120. At this time, the plurality of slots 132 are formed by the plurality of inclined guiding blades 131 so that the semi-clean air C passed through the plurality of slots 132 forms the second downwardly whirling air current D in the space 123 inside the second cyclone body 121. Then, fine dust remaining in the semi-clean air is separated by centrifugal force caused by the second downwardly whirling air current D. The separated fine dust G falls and is discharged to the second dust collecting chamber 44 through the gap 171 between the dust cap 170 and the second cyclone body 121. Cleaned air having fine dust removed re-rises and passes through a center of the air guiding member 130 and the filtering member 100 disposed on the air guiding member 130 so as to be discharged into the air discharging pipe 117. The filter 102 of the filtering member 100 filters fine dust remaining in cleaned air discharged from the second cyclone 120. A purified air E having the remaining fine dust removed passes through the vacuum generator (not shown), and then, is discharged outside the cleaner body (not shown).

When exchanging the filter 102 of the filtering member 100, or when cleaning the air guiding member 130 of the second cyclone 120, users separate the dust collecting receptacle 140 from the first cyclone body 11, and then, separate the filtering member 100 from the first cyclone body 11. Because the filtering member 100 is fixed to the first cyclone body 11 by the fixing members 105 such as screws, the users loosen the fixing member 105 so that the filtering member 100 is easily separated from the first cyclone body 11. When the filtering member 100 and the air guiding member 130 has a detachably connecting structure, the filtering member 100 can be separated from the air guiding member 130. Also, when the air guiding member 130 and the second cyclone body 121 has a detachably connecting structure, the second cyclone body 121 can be separated from the air guiding member 130. When the filtering member 100, the air guiding member 130, and the second cyclone body 121 are configured to be separated all together from the first cyclone body 11 or to be separated from each other as described above, it is convenient to clean and maintain the cyclone dust collecting apparatus 3.

Hereinafter, a cyclone dust collecting apparatus 4 for a vacuum cleaner according to the fourth embodiment of the present disclosure is described with reference to FIGS. 12 and 13.

Figure 12:
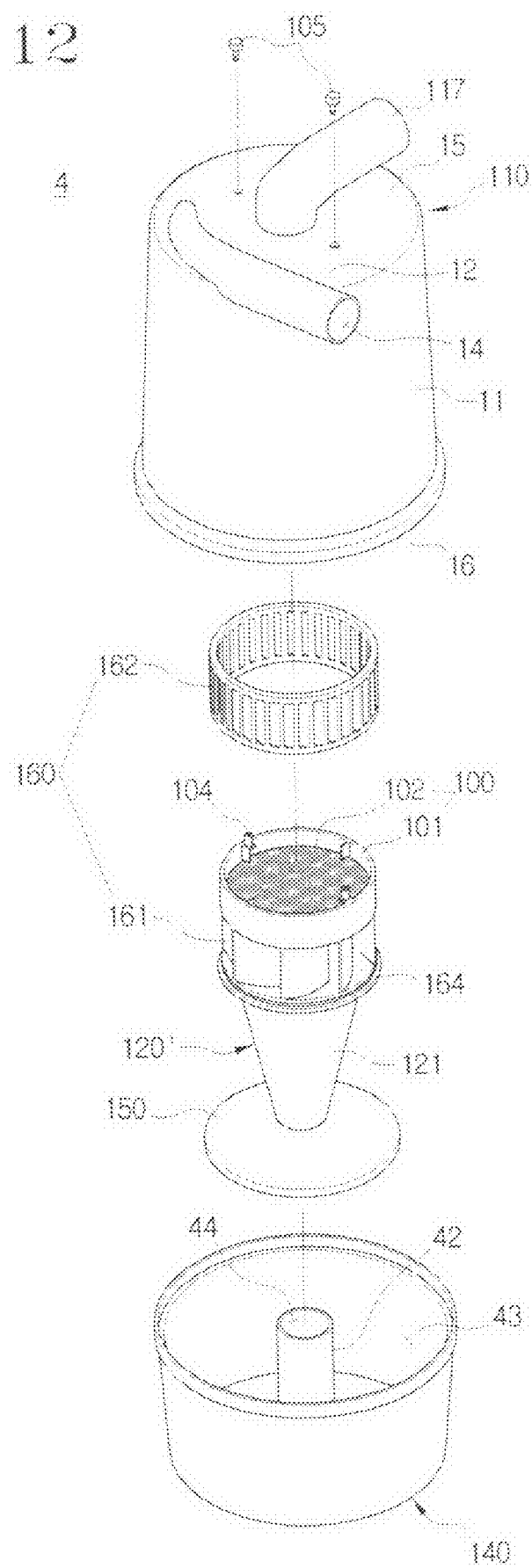
FIG. 12 is an exploded perspective view illustrating a cyclone dust collecting apparatus for a vacuum cleaner according to the fourth embodiment of the present disclosure.
Figure 13:
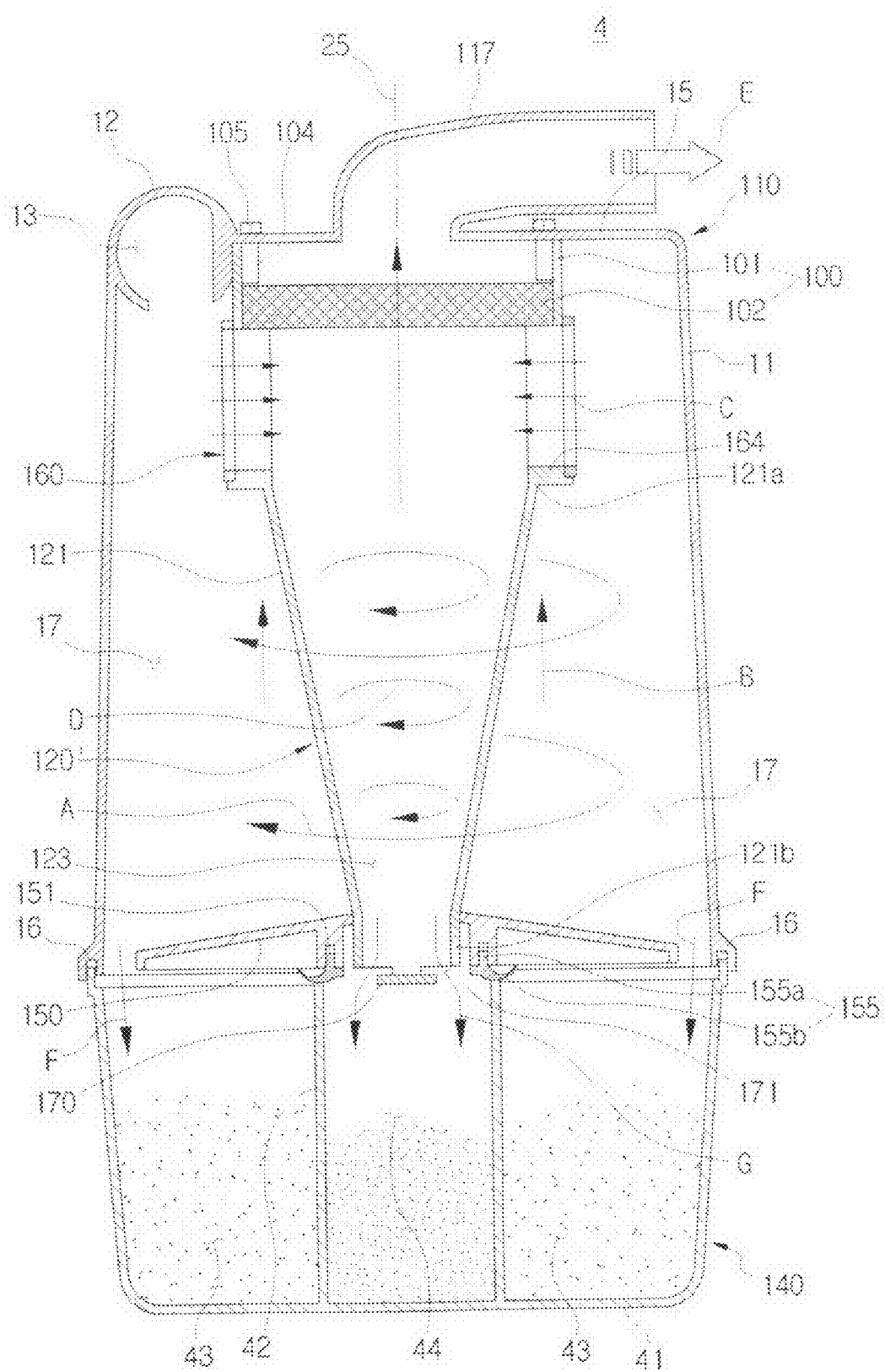
FIG. 13 is a sectional view illustrating the cyclone dust collecting apparatus of FIG. 12.

Referring to FIGS. 12 and 13, a cyclone dust collecting apparatus 4 for a vacuum cleaner according to the fourth embodiment of the present disclosure includes a first cyclone 110, a second cyclone 120', a filtering member 100, and a dust collecting receptacle 140.

The cyclone dust collecting apparatus 4 according to the fourth embodiment has the same first cyclone 110, filtering member 100, and dust collecting receptacle 140 as those of the cyclone dust collecting apparatus 3 according to the third embodiment as described above except the second cyclone 120'. Therefore, the second cyclone 120' is only described hereinafter.

The second cyclone 120' is disposed inside the first cyclone 110, takes the semi-clean air C discharged from the first cyclone 110, and forces the semi-clean air to form the second downwardly whirling air current D. Then, fine dust is separated from the semi-clean air by centrifugal force caused by the second downwardly whirling air current D.

The second cyclone 120' includes a second cyclone body 121, and an air guiding member 160. The air guiding member 160 is disposed at a top end of the second cyclone body 121, and the filtering member 100 is disposed at an upper side of the air guiding member 160. The air guiding member 160 simultaneously functions as an air discharging opening of the first cyclone 110 and an air entering opening of the second cyclone 120'. In other words, the semi-clean air discharged from the first cyclone 110 directly enters inside the second cyclone 120' via the air guiding member 160. The air guiding member 160 has a bottom plate 164 and a plurality of first and second guiding blades 161 and 162. The plurality of first and second guiding blades 161 and 162 radially arranged on the bottom plate 164 in two concentric circles based on a vertical axis 25 of the second cyclone 120' (see FIG. 7).

The bottom plate 164 is formed in a substantially doughnut shape so that the first and second guiding blades 161 and 162 are disposed on the bottom plate 164 in two concentric circles. At this time, the second guiding blades 162 are formed a separate part with a ring shape so that the second guiding blades 162 are mounted outside the first guiding blades 161. The arrangement and shape of the first and second guiding blades 161 and 162 are substantially the same as those of the first and second guiding blades 61 and 62 of the cyclone dust collecting apparatus 2 according to the second embodiment, and therefore, detailed descriptions thereof are omitted.

The second cyclone body 121 is the same as that of the cyclone dust collecting apparatus 3 according to the third embodiment as described above, and therefore, a detailed description thereof is omitted.

Furthermore, operation and function of the cyclone dust collecting apparatus 4 for a vacuum cleaner according to the fourth embodiment is substantially the same as those of the cyclone dust collecting apparatus 3 according to the third embodiment, and therefore, detailed descriptions thereof are omitted. However, there is one exception that the plurality of second guiding blades 162 filters dust moving with the semi-clean air, which is discharged from the first cyclone body 11 to the air guiding member 160, and the plurality of first guiding blades 161 forces the semi-clean air passed the air guiding member 160 to form the whirling air current. In other words, the second guiding blades 162 serves as a filter that filters dust entering from the first cyclone 110 to the second cyclone 120'.

Hereinafter, a cyclone dust collecting apparatus 5 for a vacuum cleaner according to the fifth embodiment of the present disclosure is explained with reference to FIGS. 14 to 21.

Figure 14:
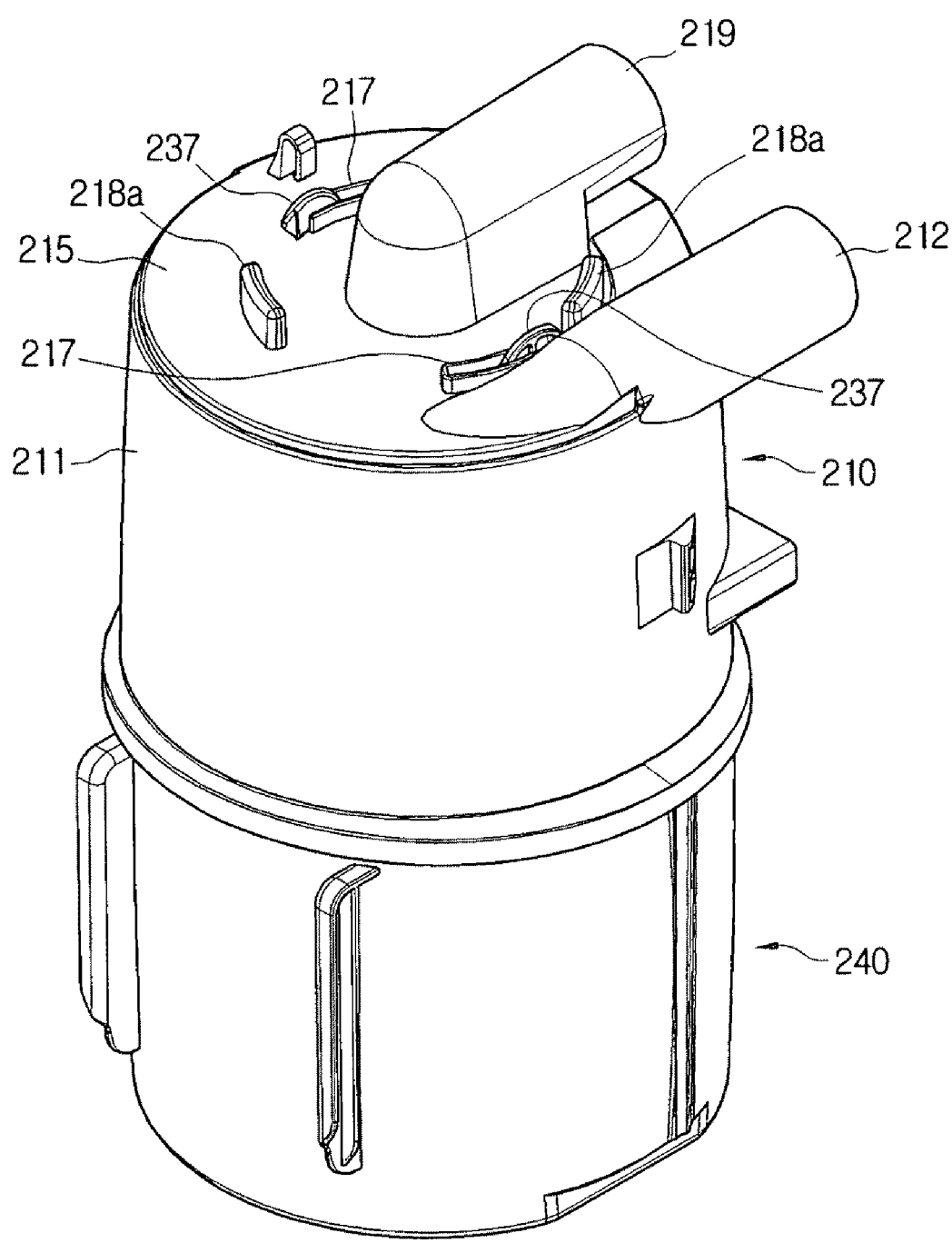
FIG. 14 is a perspective view illustrating a cyclone dust collecting apparatus for a vacuum cleaner according to the fifth embodiment of the present disclosure.
Figure 15:
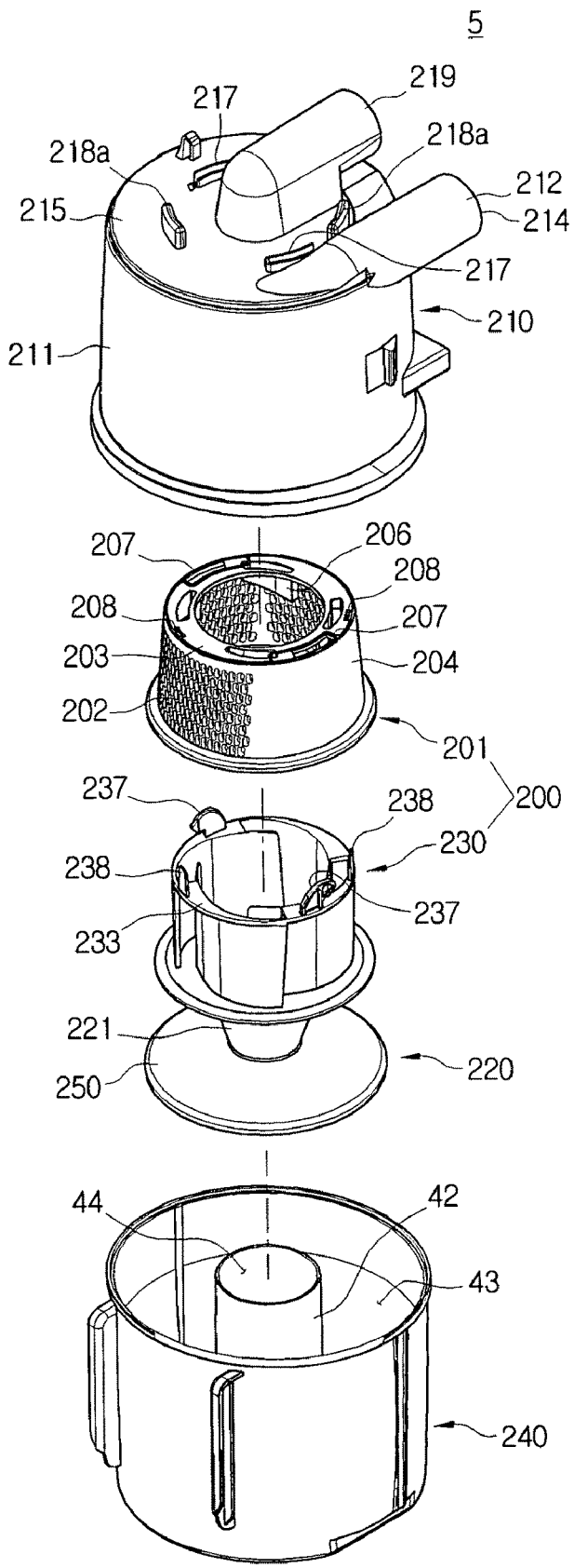
FIG. 15 is an exploded perspective view illustrating the cyclone dust collecting apparatus of FIG. 14.

Referring to FIGS. 14 and 15, the cyclone dust collecting apparatus 5 for a vacuum cleaner according to the fifth embodiment of the present disclosure may include a first cyclone 210, a second cyclone 220, and a dust collecting receptacle 240.

The first cyclone 210 draws-in dust-laden air containing dust, and forces the dust-laden air to downwardly whirl inside the first cyclone 210 so that dust is separated from the dust-laden air by centrifugal force. Then, the first cyclone 210 discharges air having dust partially removed (hereinafter, referred to as semi-clean air) to the second cyclone 220.

The first cyclone 210 may have a first cyclone body 211 and an air suction pipe 212.

The first cyclone body 211 may be formed in a substantially hollow cylindrical shape with a top end closed by a top wall 215 and an opened bottom end. At an upper side of the first cyclone body 211 may be formed an air suction hole 213 through which the dust-laden air is drawn-in. A plurality of locking holes 217, into which a plurality of locking hooks 237 of an air guiding member 200 as described below is inserted, may be formed at the top wall 215 of the first cyclone body 211. Also, a plurality of guiding holes 218, into which a plurality of positioning members 238 as described below is inserted, may be formed at the top wall 215 of the first cyclone body 211. Each of the plurality of guiding holes 218 may be formed to have a length L larger than the size of a width W of the positioning member 238 so that the positioning members 238 can move within the guiding holes 218. Furthermore, as illustrated in FIGS. 14 and 15, a protection cap 218a may be disposed above each of the plurality of guiding holes 218.

The bottom end of the first cyclone body 211 is in fluid communication with the dust collecting receptacle 240. The first cyclone body 211 may be long enough to form a whirling space 211a in which the drawn-in dust-laden air can whirl downwardly. In other words, the first cyclone body 211 may have the whirling space 211a of the dust-laden air between the air guiding member 200 and a backflow preventing member 250 as described below.

Figure 16:
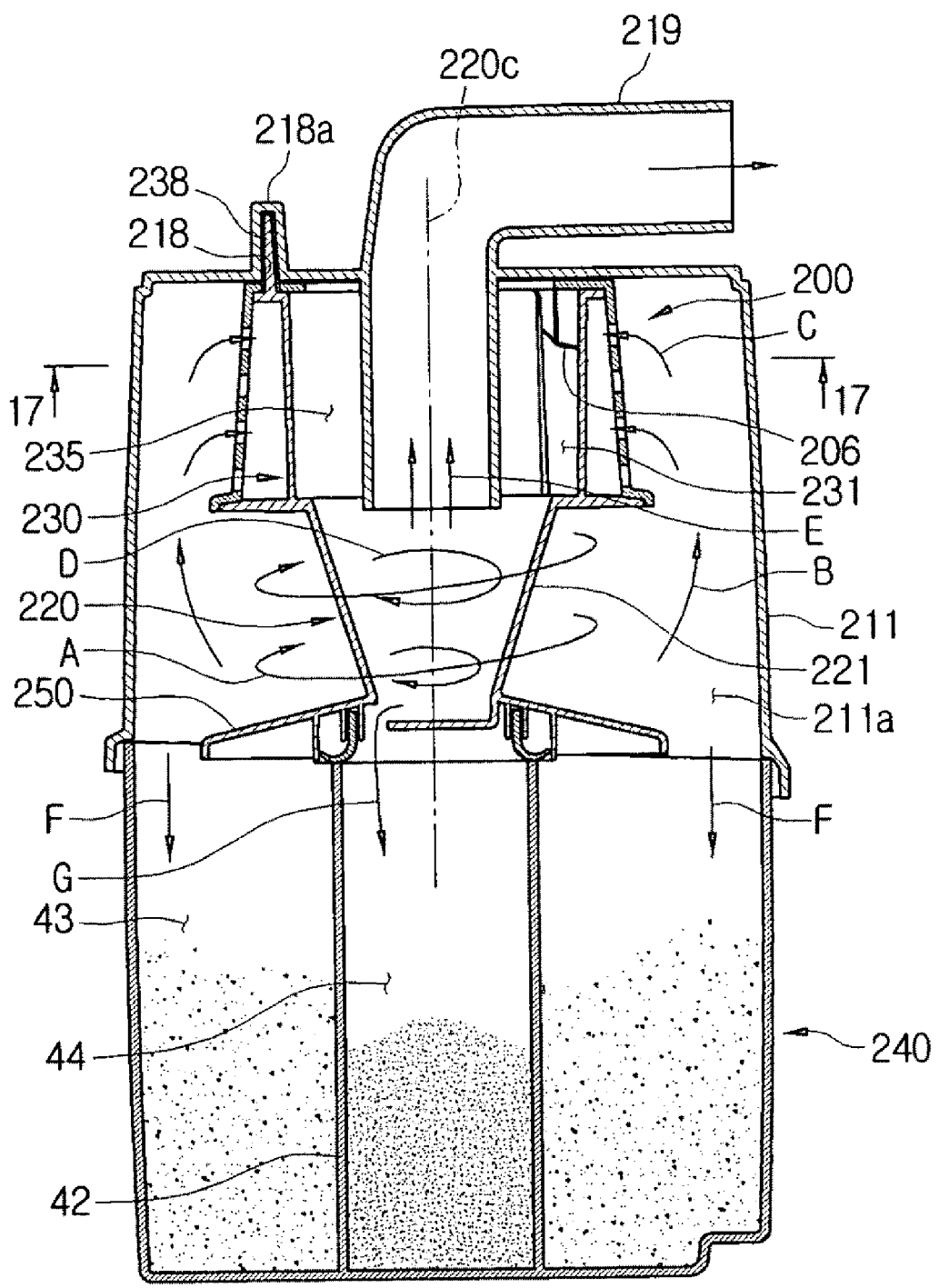
FIG. 16 is a sectional view illustrating the cyclone dust collecting apparatus of FIG. 14.

The air suction pipe 212 is disposed at the upper side of the first cyclone 210, namely, at the upper side of the first cyclone body 211, and is disposed in a substantially tangential direction to the first cyclone body 211 as shown in FIG. 16. Also, the air suction pipe 212 is downwardly inclined with respect to the first cyclone body 211 so as to force the dust-laden air drawing-in inside the first cyclone body 211 to form a first downwardly whirling air current A that the dust-laden air whirls downwardly. In other words, the air suction pipe 212 is disposed at the upper side of the first cyclone body 211 such that an entrance 214 of the air suction pipe 212 is at a higher level than an exit thereof. The exit of the air suction pipe 212 may form the air suction hole 213 of the first cyclone body 211.

The second cyclone 220 is disposed inside the first cyclone 210, draws-in the semi-clean air C discharged from the first cyclone 210, and forces the semi-clean air C to form a second whirling air current D. Then, fine dust remaining in the semi-clean air C discharged from the first cyclone 210 is separated by the centrifugal force caused by the second whirling air current D.

The second cyclone 220 has a second cyclone body 221, an air guiding member 200, and an air-discharging pipe 219.

The air guiding member 200 is disposed at a bottom surface of the top wall 215 of the first cyclone body 211. The bottom end of the air guiding member 200 is connected with the second cyclone body 221. The air guiding member 200 may simultaneously function as an air discharging opening of the first cyclone 210 and an air entering opening of the second cyclone 220. That is, the semi-clean air discharged from the first cyclone 210 directly enters inside the second cyclone 220 via the air guiding member 200. The air guiding member 200 may be detachably disposed at the first cyclone 210. The air guiding member 200 may have a grill member 201 and a plurality of guiding blades 230.

Figure 19:
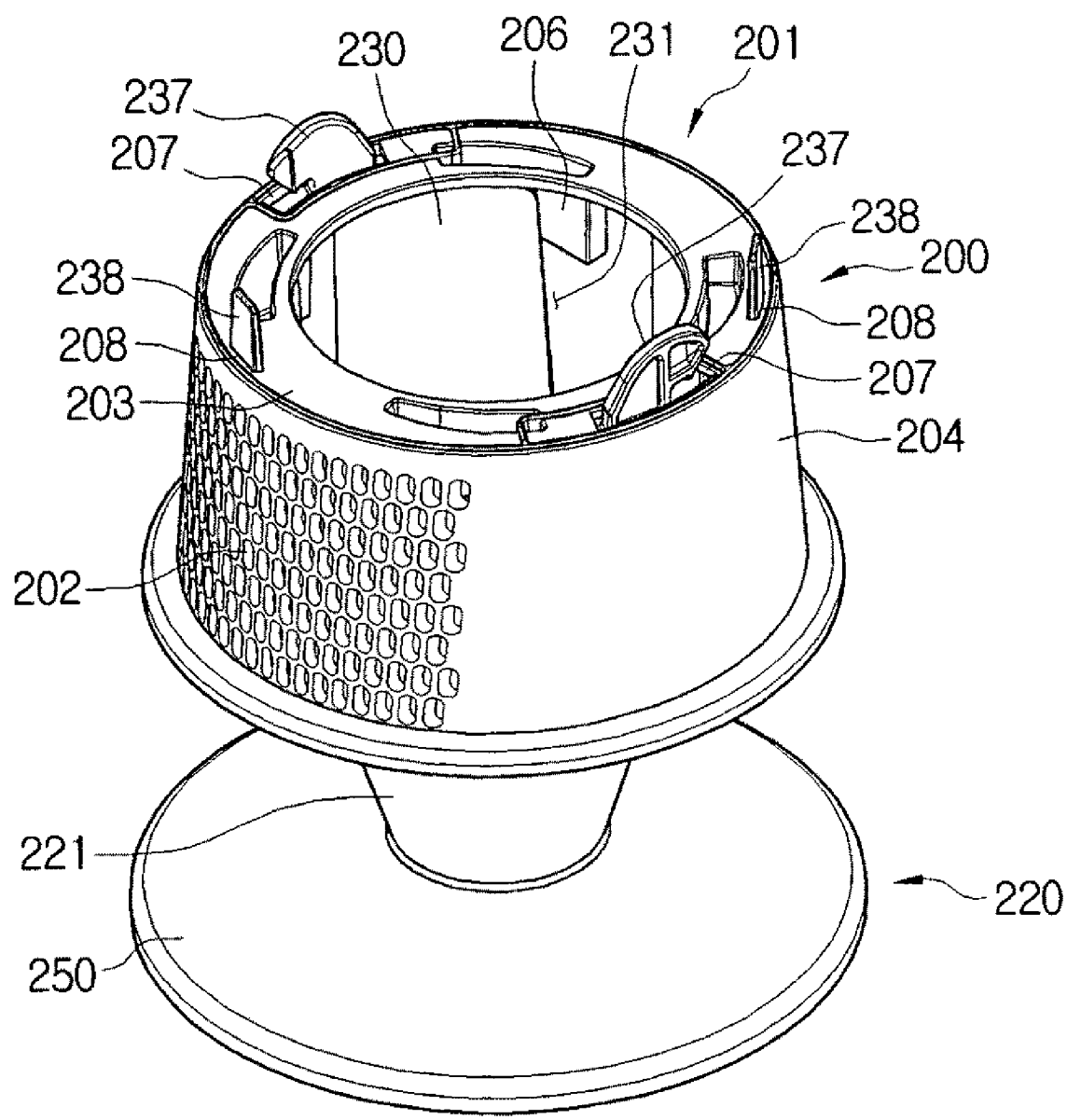
FIG. 19 is a perspective view illustrating an air guiding member being coupled to a second cyclone of the cyclone dust collecting apparatus of FIG. 15.
Figure 20:
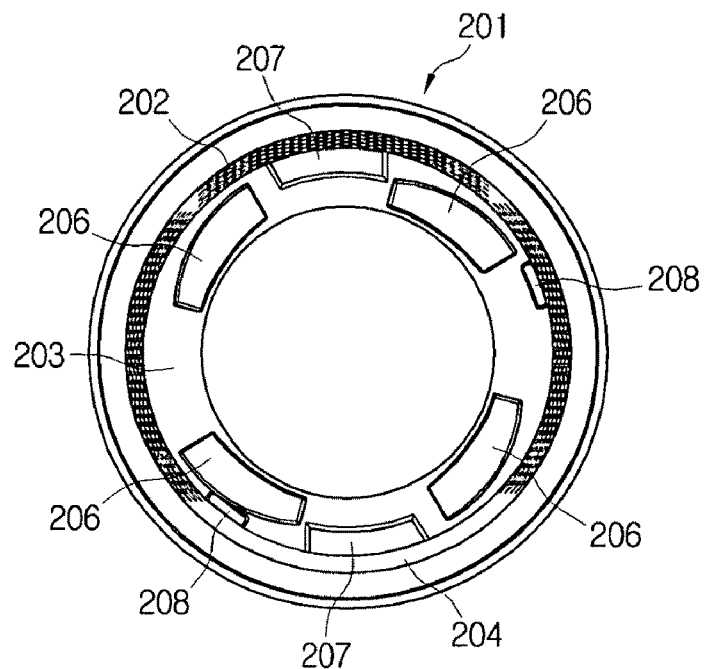
FIG. 20 is a bottom view illustrating a grill member of the cyclone dust collecting apparatus of FIG. 15.
Figure 21:
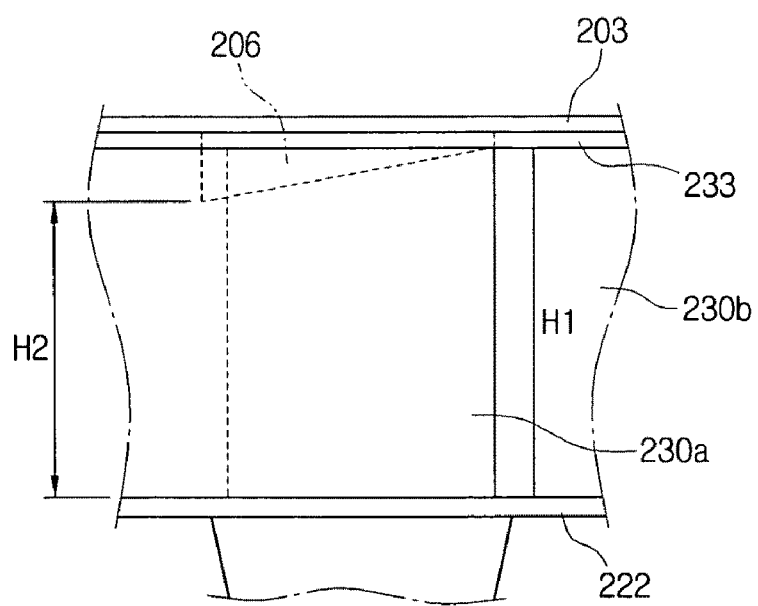
FIG. 21 is a view illustrating a slot structure when a grill member and a plurality of guiding blades of the cyclone dust collecting apparatus of FIG. 14 are coupled with each other.

The grill member 201, as illustrated in FIGS. 15 and 19, may be formed in a substantially hollow cylindrical shape, and may be disposed coaxially with a vertical axis 220C of the second cyclone 220. A plurality of holes 202 may be formed at an outer circumferential surface of the grill member 201. The plurality of holes 202 of the grill member 201 may be formed in a mesh shape. The grill member 201 filters dust entering the air guiding member 200 along with the semi-clean air C discharged from the first cyclone 210. That is, the grill member 201 may function as a filter to filter the semi-clean air C being discharged from the first cyclone 210 to the second cyclone 220.

Also, the grill member 201 may have a blocking portion 204 at which the plurality of holes 202 is not formed. The blocking portion 204, as illustrated in FIG. 17, may be formed near the air suction hole 213 of the first cyclone 210 and may prevent dust-laden air entering the first cyclone 210 through the air suction pipe 212 from directly entering the second cyclone 220.

A base plate 203 to allow the grill member 201 to be fixed to the top wall 215 of the first cyclone body 211 may be disposed at a top end of the grill member 201. A plurality of positioning holes 208 to fix a position of the plurality of guiding blades 230 with respect to the grill member 201 may be formed at the base plate 203. The plurality of guiding blades 230 may have the plurality of positioning members 238 to be inserted into the plurality of positioning holes 208. Also, the base plate 203 of the grill member 201 may be provided with a plurality of through holes 207 through which the plurality of locking hooks 237 of the plurality of guiding blades 230 passes.

The plurality of guiding blades 230 may be radially arranged in a circular shape based on the vertical axis 220C of the second cyclone 220. In this embodiment, as illustrated in FIG. 17, the plurality of guiding blades 230 is arranged to form a concentric circle with the grill member 201 based on the vertical axis 220C of the second cyclone 220. That is, the grill member 201 and the plurality of guiding blades 230 are arranged to form two concentric circles based on the vertical axis 220C of the second cyclone 220.

Figure 17:
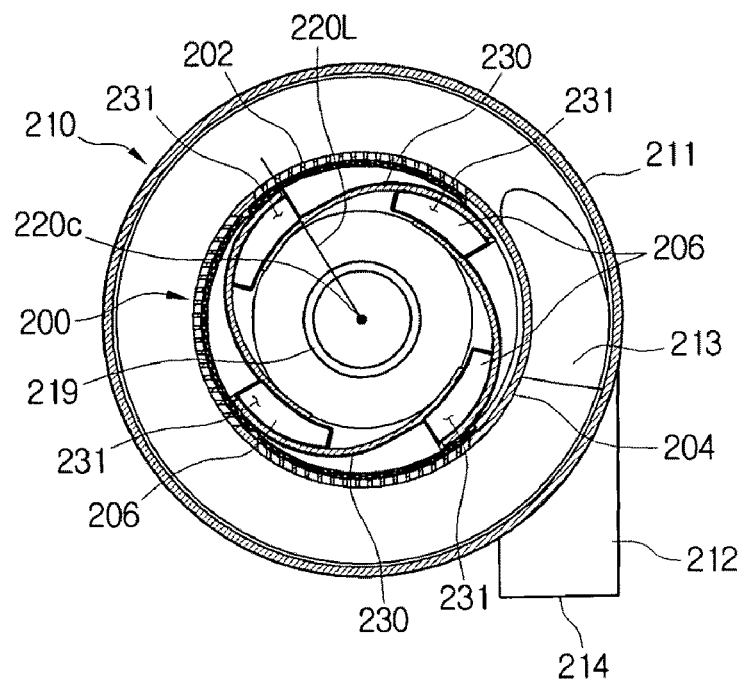
FIG. 17 is a sectional view illustrating the cyclone dust collecting apparatus of FIG. 16, taken along a line 17-17 in FIG. 16.
Figure 18:
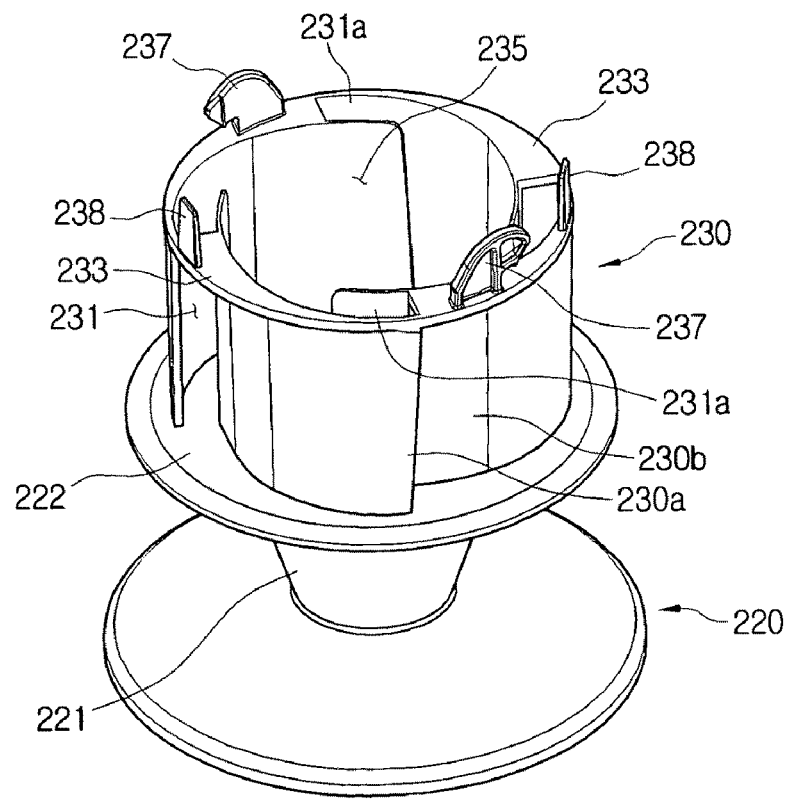
FIG. 18 is a perspective view illustrating a second cyclone of the cyclone dust collecting apparatus of FIG. 15.

Referring to FIGS. 17 and 18, spaces defined between the pluralities of guiding blades 230 form a plurality of slots 231 through which the semi-clean air entering through the grill member 201 passes. The plurality of holes 202 formed at the grill member 201 is equivalent to the air discharging opening of the first cyclone 210, and an exit of each of the plurality of slots 231 formed by the plurality of guiding blades 230 is equivalent to the air entering opening of the second cyclone 220. Therefore, the air discharging opening, through which the semi-clean air is discharged from the first cyclone 210, and the air entering opening, through which the semi-clean air enters the second cyclone 220, may include a plurality of air discharging openings and a plurality of air entering openings, respectively. The air discharging opening may be disposed at the same or similar to the level of the air entering opening.

Also, each of the plurality of guiding blades 230, as illustrated in FIG. 17, may be disposed to be inclined with respect to a straight line 220L joining a center of the air guiding member 200, namely, the vertical axis 220C of the second cyclone 220. Therefore, the plurality of guiding blades 230 forces air passing through them to form a whirling air current. As a result, the semi-clean air passing through the plurality of guiding blades 230 forms the second whirling air current C in the inner space 235 of the second cyclone 220.

Furthermore, as illustrated in FIG. 18, a reinforcing plate 233 may be formed at the top end of the plurality of guiding blades 230. The reinforcing plate 233 may support the plurality of guiding blades 230 to uniformly maintain intervals between them. The reinforcing plate 233 may be provided with the plurality of locking hooks 237 to allow the plurality of guiding blades 230 to be fixed to the top wall 215 of the first cyclone body 211. Also, the reinforcing plate 233 may be provided with the plurality of positioning members 238 to fix the position of the plurality of guiding blades 230 with respect to the grill member 201.

The base plate 203 formed at the top end of the grill member 200 may be provided with the plurality of through holes 207 into which the plurality of locking hooks 237 is inserted and the plurality of positioning holes 208 into which the plurality of positioning members 238 is inserted. The plurality of locking holes 217 into which the plurality of locking hooks 237 is inserted may be formed at the top wall 215 of the first cyclone body 211. The plurality of guiding holes 218 into which the plurality of positioning members 238 is inserted also may be formed at the top wall 215 of the first cyclone body 211. Each of the plurality of guiding holes 218 may be formed to have a length L larger than the size of a width W of the positioning member 238 so that the positioning members 238 can move within the guiding holes 218.

In this embodiment, the base plate 203 of the grill member 201 is provided with two positioning holes 208 and two through holes 207, and the reinforcing plate 233 of the plurality of guiding blades 230 is provided with two positioning members 238 and two locking hooks 237. Also, the top wall 215 of the first cyclone body 211 is provided with two guiding holes 218 and two locking holes 217 into which two positioning members 238 and two locking hooks 237 of the plurality of guiding blades 230 are inserted, respectively.

Therefore, the locking hooks 237 and the positioning members 238 of the plurality of guiding blades 230 are inserted in the through holes 207 and the positioning holes 208 of the grill member 201 so that the plurality of guiding blades 230 and the grill member 201 are assembled to form the air guiding member 200 as illustrated in FIG. 19. Then, after the locking hooks 237 and the positioning members 238 of the plurality of guiding blades 230 are inserted in the locking holes 217 and the guiding holes 218 of the top wall 215 of the first cyclone body 211, the air guiding member 200, that is, the grill member 201 is rotated by a predetermined angle so that the locking hooks 237 are hooked on the top wall 215 of the first cyclone body 211, so the plurality of guiding blades 230 is fixed to the first cyclone body 211. At this time, the positioning members 238 are rotated within the guiding holes 218 as much as the locking hooks 237 are rotated. When the plurality of guiding blades 230 is fixed to the first cyclone body 211, the grill member 201 coupled to the plurality of guiding blades 230 is also fixed to the first cyclone body 211. As a result, the air guiding member 200 is fixed to the top wall 215 of the first cyclone body 211.

On the other hands, after the air guiding member 200 is rotated at a predetermined angle in a reverse direction, the air guiding member 200 can be separated from the first cyclone body 211. Therefore, the air guiding member 200 and the first cyclone 210 may easily be separated from and coupled to each other. Also, the grill member 201 can easily be taken out the locking hooks 237 and the positioning members 238 formed at the reinforcing plate 233 of the plurality of guiding blades 230. So, the plurality of guiding blades 230 and the grill member 201 may easily be separated from and coupled to each other.

An entering slant portion 206 may be disposed at an area in which two neighboring guiding blades (for example, 230a and 230b in FIGS. 18 and 21) among the plurality of guiding blades 230 face each other, namely, at a top portion 231a of the slot 231 formed by the two neighboring guiding blades 230a and 230b. The entering slant portion 206 may gradually decrease the section area of the air entering passage that the slot 231 forms. The entering slant portion 206 may be formed so that a height H1 of an entrance of the slot 231, namely, the first end of the slot 231 facing the grill member 201 is higher than a height H2 of an exit of the slot 231, namely, the second end of the slot 231 to face the inner space 235 of the second cyclone 220. That is, the entering slant portion 206 may be formed to be inclined downwardly in a moving direction of the semi-clean air at the top portion 231a of the slot 231. In other words, the grill member 201 may include a plurality of entering slant portions 206 that is formed at the top end of the grill member 201 corresponding to top portions 231a of the plurality of slots 231 and projects to be downwardly inclined from an inner surface of the top end of the grill member 201.

The entering slant portion 206 may increase the speed of the semi-clean air entering through the slot 231 and may guide the entering semi-clean air to whirl downwardly. The entering slant portion 206 may be formed to have a number corresponding to a number of the plurality of slots 231 formed by the plurality of guiding blades 230. In this embodiment, four guiding blades 230 form four slots 231 so that four entering slant portions 206 are formed.

The entering slant portions 206, as illustrated in FIGS. 15 and 19, may be formed on an inner surface of the base plate 203 of the grill member 201. That is, the plurality of entering slant portions 206 may be formed on portions of the base plate 203 of the grill member 201 that when the plurality of guiding blades 230 is inserted inside the grill member 201, the top portions 231a of the plurality of slots 230 contact. Alternatively, although not illustrated, the entering slant portion 206 may be formed to extend from the reinforcing plate 233 of the plurality of guiding blades 230 in a single body with the plurality of guiding blades 230.

The plurality of guiding blades 230, as illustrated in FIG. 18, may be formed in a single body with the second cyclone body 221. That is, the plurality of guiding blades 230 may be radially disposed on a top end 222 of the second cyclone body 221 based on the vertical axis 220C of the second cyclone body 221, and may be formed in a single body with the second cyclone body 221. Alternatively, although not illustrated, the plurality of guiding blades 230 may be formed separately from the second cyclone body 221 so that the plurality of guiding blades 230 can be separated from and coupled to the second cyclone body 221.

The air discharging pipe 219 may be disposed at a center of the top wall 215 of the first cyclone body 210, and may be formed in a substantially hollow cylindrical shape and in the shape of the letter "L". An opened top end of the air-discharging pipe 219 may be in fluid communication with the vacuum generator (not illustrated), and an opened bottom end of the air-discharging pipe 219 may be in fluid communication with the inner space 235 of the second cyclone body 221, that is, the space 235 in which the second downwardly whirling air current D is formed. The semi-clean air entering the second cyclone body 221 may downwardly whirl, and then, re-rise to enter the air-discharging pipe 219. While the semi-clean air may be downwardly whirling inside the second cyclone body 221, fine dust may be removed from the semi-clean air. Therefore, the air-discharging pipe 219 may discharge cleaned air having fine dust removed in the second cyclone 220 in a direction opposite to the gravity direction. At this time, the bottom end of the air-discharging pipe 219 may extend to the same level as the bottom end of the air guiding member 200, or to a lower level than the bottom end of the air guiding member 200.

The second cyclone body 221 and the backflow preventing member 250 according to the fifth embodiment are the same or similar to the second cyclone body 21 and the backflow preventing member 50 of the cyclone dust collecting apparatus 1 according to the first embodiment of the present disclosure, and therefore, detailed descriptions thereof are omitted.

The dust collecting receptacle 240 of the cyclone dust collecting apparatus 5 according to the fifth embodiment is the same or similar to the dust collecting receptacle 40 of the cyclone dust collecting apparatus 1 according to the first embodiment of the present disclosure, and therefore, a detailed description thereof is omitted.

Hereinafter, operation and function of the cyclone dust collecting apparatus 5 for a vacuum cleaner according to the fifth embodiment of the present disclosure with the above-described structure is explained with reference to FIGS. 14 to 21.

When the vacuum cleaner is turned on, the vacuum generator (not shown) is operated to generate suction force. Dust-laden air is drawn-in into the air suction pipe 212 of the first cyclone 210 by the suction force. The dust-laden air entering the air suction pipe 212 enters the inner space 211a of the first cyclone body 211 through the air suction hole 213. At this time, the blocking portion 204 is formed at the grill member 201 near the air suction hole 213 so that the dust-laden air entering the first cyclone body 211 does not directly enter the second cyclone 220.

Also, the air suction pipe 212 is downwardly inclined in a tangential direction to the upper side of the first cyclone body 211 so that the dust-laden air passes through the air suction pipe 212 and forms the first downwardly whirling air current A in the inner space 211a of the first cyclone body 211. Then, dust is separated from the dust-laden air by centrifugal force caused by the first downwardly whirling air current A. The separated dust F falls along the inner surface of the first cyclone body 211, and then, is collected in the first dust collecting chamber 43 of the dust collecting receptacle 240 through the gap between the backflow preventing member 250 and the inner surface of the first cyclone body 211. Because the backflow preventing member 250 is made of an elastic material, heavy dust with a larger size than the size of the gap between the backflow preventing member 250 and the first cyclone body 211 such as bottle caps, cigarette butts, and so on can pass along the backflow preventing member 250 so as to be collected in the dust collecting receptacle 240.

The semi-clean air B having dust separated rises to enter the inside of the grill member 201 through the plurality of holes 202 of the grill member 201 of the air guiding member 200. The semi-clean air C entering the inside of the grill member 201 enters the plurality of slots 231 formed by the plurality of guiding blades 230. The semi-clean air passes through the plurality of slots 231, and enters the inside of the second cyclone 220. At this time, the plurality of slots 231 are formed by the plurality of inclined guiding blades 230, and the downwardly inclined entering slant portion 206 is formed at the top portion 231a of each of the plurality of slots 231 so that the semi-clean air passed through the plurality of slots 231 forms the second downwardly whirling air current D in the inner space 235 of the second cyclone body 221. Then, fine dust remaining in the semi-clean air is separated by centrifugal force caused by the second downwardly whirling air current D. The separated fine dust G falls and is collected in the second dust collecting chamber 44.

Cleaned air E having fine dust removed re-rises to enter the air discharging pipe 219 disposed at the center of the air guiding member 200. The cleaned air E entering the air discharging pipe 219 passes through the vacuum generator (not shown), and then, is discharged outside the cleaner body (not shown).

According to the cyclone dust collecting apparatus for a vacuum cleaner according to an embodiment of the present disclosure, because the first cyclone is in fluid communication with the second cyclone via a plurality of air pathways, namely, the plurality of slots, the pressure loss is decreased as compared with the conventional cyclone dust collecting apparatus. As a result, the present disclosure can provide a cyclone dust collecting apparatus for a vacuum cleaner that has a less pressure loss and a higher fine dust collecting efficiency than the conventional cyclone dust collecting apparatus.

When the filtering member is disposed at the upper side of the second cyclone, fine dust remaining in the cleaned air discharged from the second cyclone is removed so that the vacuum generator is not damaged by the fine dust.

Furthermore, in the cyclone dust collecting apparatus for a vacuum cleaner according to an embodiment of the present disclosure, because the first cyclone is directly in fluid communication with the second cyclone by the air guiding member, which simultaneously functions as an air discharging opening of the first cyclone and an air entering opening of the second cyclone, the length of the air pathway between the first and second cyclones is very short. As a result, a compact cyclone dust collecting apparatus can be provided, and the pressure loss of the cyclone dust collecting apparatus can be minimized.

Also, in the cyclone dust collecting apparatus according to an embodiment of the present disclosure, because the filtering member, the air guiding member, and the second cyclone body are configured to be separated all together from the first cyclone body or to be separated from each other, it is convenient to clean and maintain the cyclone dust collecting apparatus.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the disclosure.

What is claimed is:

1. A cyclone dust collecting apparatus for a vacuum cleaner, comprising:
   a first cyclone;
   a second cyclone disposed inside the first cyclone; and
   an air guiding member to form an entrance of the second cyclone through which semi-clean air discharged from the first cyclone enters;
   wherein the air guiding member comprises:
   a grill member having a plurality of holes; and
   a plurality of guiding blades disposed inside the grill member.

2. The cyclone dust collecting apparatus of claim 1, wherein the grill member and the plurality of guiding blades are arranged in two circles that are concentric about a vertical axis of the second cyclone.

3. The cyclone dust collecting apparatus of claim 1, wherein the grill member is formed in a mesh shape.

4. The cyclone dust collecting apparatus of claim 1, wherein the grill member comprises a blocking portion at which the plurality of holes is not formed.

5. The cyclone dust collecting apparatus of claim 4, wherein the blocking portion is formed near an air suction hole of the first cyclone.

6. The cyclone contaminant collecting apparatus of claim 1, wherein the plurality of guiding blades forms a plurality of slots through which the semi-clean air passed through the grill member enters; and
   wherein the plurality of slots each have an entrance and an exit and the plurality of slots is inclined so that a height of the entrance of each of the plurality of slots is higher than a height of the exit of each of the plurality of slots.

7. The cyclone dust collecting apparatus of claim 6, wherein the grill member comprises a plurality of entering slant portions that is formed at a top end of the grill member corresponding to top portions of the plurality of slots and projects to be downwardly inclined from an inner surface of the top end of the grill member.

8. The cyclone dust collecting apparatus of claim 1, wherein the air guiding member is detachably disposed at the first cyclone.

9. The cyclone dust collecting apparatus of claim 8, wherein the grill member and the plurality of guiding blades of the air guiding member are separated from each other.

10. The cyclone dust collecting apparatus of claim 8, wherein the plurality of guiding blades comprises a plurality of locking hooks; and wherein the first cyclone comprises a plurality of locking holes formed to fix the plurality of locking hooks.

11. The cyclone dust collecting apparatus of claim 1, further comprising:
    an air-discharging pipe that is disposed at a center of a top wall of the first cyclone, and that extends to the same level as a bottom end of the air guiding member, or to a level lower than the bottom end of the air guiding member, wherein
    the air-discharging pipe discharges cleaned air, which whirls downwardly and rises up inside the second cyclone, in a direction opposite to gravity.

12. The cyclone dust collecting apparatus of claim 1, further comprising:
    a dust collecting receptacle detachably disposed under the first and second cyclones so as to collect dust discharged from each of the first and second cyclones.

13. The cyclone dust collecting apparatus of claim 12, wherein the dust collecting receptacle comprises:
    a first dust collecting chamber to collect dust separated from the first cyclone; and
    a second dust collecting chamber to collect fine dust separated from the second cyclone.

* * * * *